US012723433B2

(12) United States Patent
Barker et al.

(10) Patent No.: US 12,723,433 B2
(45) Date of Patent: Sep. 1, 2026

(54) LOCKSET INDICATOR ASSEMBLIES

(71) Applicant: Schlage Lock Company LLC, Carmel, IN (US)

(72) Inventors: Kenton H. Barker, Fort Collins, CA (US); Nathanael S. Murphy, Queen Creek, AZ (US); Austin Roup, Woodland Park, CO (US); Appu Jacob Varghese, Monument, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 18/655,713

(22) Filed: May 6, 2024

(65) Prior Publication Data

US 2025/0341116 A1 Nov. 6, 2025

Related U.S. Application Data

(60) Provisional application No. 63/464,021, filed on May 4, 2023, provisional application No. 63/464,010, filed (Continued)

(51) Int. Cl.
*E05B 41/00* (2006.01)
*E05B 1/00* (2006.01)

(52) U.S. Cl.
CPC ............ *E05B 41/00* (2013.01); *E05B 1/0084* (2013.01)

(58) Field of Classification Search
CPC ............................... E05B 41/00; E05B 1/0084
See application file for complete search history.

(56) References Cited

U.S. PATENT DOCUMENTS 481,960 A * 9/1892 Lindstrom .............. E05B 41/00 40/907
590,418 A * 9/1897 Langford ................ E05B 41/00 40/907

(Continued)

FOREIGN PATENT DOCUMENTS

CH 379945 A * 7/1964 ............. E05B 41/00
GB 196345 A * 4/1923 ............. E05B 41/00

(Continued)

OTHER PUBLICATIONS

International Search Report and Written Opinion; International Searching Authority; International Application No. PCT/US2024/028020; Oct. 16, 2024; 6 pages.

(Continued)

*Primary Examiner* — Carlos Lugo
(74) *Attorney, Agent, or Firm* — Taft Stettinius & Hollister LLP

(57) ABSTRACT

An exemplary indicator assembly is configured for use with a lockset, and generally includes a backplate, a transfer link, and an indicator. The backplate has a first side and an opposite second side, and includes an opening. The transfer link is mounted for rotation relative to the backplate. The transfer link includes an input portion positioned on the first side of the backplate, an actuating portion positioned on the second side of the backplate, and an arm extending through the opening. The input portion is configured to drive the transfer link from a first transfer link position to a second transfer link position in response to the lockset transitioning from the first state to the second state. The indicator is positioned on the second side of the backplate and engaged with the actuating portion such that the indicator selectively displays a first indicium relating to the first state.

17 Claims, 23 Drawing Sheets

Related U.S. Application Data on May 4, 2023, provisional application No. 63/464,003, filed on May 4, 2023.

(56) References Cited

U.S. PATENT DOCUMENTS

| | | | | | |
|---|---|---|---|---|---|
| 1,099,106 | A * | 6/1914 | Wevat | E05B 41/00 40/907 |
| 1,337,401 | A * | 4/1920 | Heberling | E05B 41/00 40/907 |
| 2,565,669 | A * | 8/1951 | Smith | E05B 41/00 40/907 |
| 4,490,999 | A * | 1/1985 | Castle | E05B 41/00 70/330 |
| 4,559,796 | A * | 12/1985 | De, Sr. | E05B 41/00 70/432 |
| 6,938,445 | B2 * | 9/2005 | Huang | E05B 41/00 70/432 |
| 10,745,942 | B2 * | 8/2020 | Lehner, Jr. | E05B 65/1093 |
| 10,920,466 | B2 * | 2/2021 | Long | B64C 1/1407 |
| 2011/0016938 | A1 | 1/2011 | Chi | |
| 2015/0315816 | A1 | 11/2015 | Gopalakrishnan et al. | |
| 2020/0408002 | A1 | 12/2020 | Woodley et al. | |
| 2021/0207398 | A1 | 7/2021 | Zamboni | |
| 2022/0235576 | A1 | 7/2022 | Basavaraju et al. | |

FOREIGN PATENT DOCUMENTS

| | | | | |
|---|---|---|---|---|
| GB | 338302 | A * | 11/1930 | E05B 41/00 |
| GB | 431583 | A * | 7/1935 | E05B 41/00 |
| KR | 820001297 | Y1 | 6/1982 | |
| KR | 102258951 | B1 | 6/2021 | |

OTHER PUBLICATIONS

AU Examination Report No. 1; IP Australia; Australlian Application No. 2024265035; Jul. 11, 2026; 4 pages.

* cited by examiner

LOCKSET INDICATOR ASSEMBLIES

CROSS-REFERENCE TO RELATED APPLICATIONS

The present application claims the benefit of U.S. Provisional Patent Application No. 63/464,003, filed May 4, 2023, of U.S. Provisional Patent Application No. 63/464,010, filed May 4, 2023, of U.S. Provisional Patent Application No. 63/464,021, filed May 4, 2023, and of US patent application Ser. No. 18/655,767, filed May 6, 2024, the contents of each of which applications are incorporated by reference in their entirety.

TECHNICAL FIELD

The present disclosure generally relates to status-indicating access control devices, and more particularly but not exclusively relates to status-indicating locksets.

BACKGROUND

Status indicators are occasionally included in access control devices in order to provide a user with an indication regarding a state of the access control device, such as a locked/unlocked state. In the realm of mechanical status-indicating locksets, currently-available options generally fall into one of two categories, each of which has its own advantages and disadvantages.

Certain lower-cost locksets contain relatively small indicator signs that are constrained to remain within a predetermined footprint defined by the corresponding lockset type. For example, a status-indicating tubular lockset or status-indicating cylindrical lockset may include a circular rose in which the indicator sign is seated, and the rose may have a diameter similar to that of a non-status-indicating lockset. While such locksets have certain advantages (e.g., lower cost, simpler installation), they are also typically associated with certain disadvantages. Disadvantages can include reduced visibility and legibility due to sign limitations (size, location, and orientation of text/symbols), limited viewing angle, lower durability, limited applications (e.g., privacy function only), and/or susceptibility to tampering.

The marketplace also currently offers certain higher-cost locksets that include relatively large indicator signs designed to operate within a larger footprint, such as an elongated escutcheon. While such locksets have certain advantages (e.g., greater durability, enhanced visibility and legibility), they are also typically associated with certain disadvantages, such as higher cost, more complex installation, and/or special or non-standard door preparation.

In many situations, the cost of a higher performing indicator lock is prohibitive. As an example, a mortise lock indicator generally involves higher costs associated with: the lockset, the door preparation, and/or installation labor. A high-performing mortise lock with an indicator may cost a consumer three or more times the price of a status-indicating tubular or cylindrical lockset. However, lower-cost indicator locksets may be accompanied by substantially inferior performance and durability. For these reasons among others, there remains a need for further improvements in this technological field.

SUMMARY

An exemplary indicator assembly is configured for use with a lockset, and generally includes a backplate, a transfer link, and an indicator. The backplate has a first side and an opposite second side, and includes an opening. The transfer link is mounted for rotation relative to the backplate. The transfer link includes an input portion positioned on the first side of the backplate, an actuating portion positioned on the second side of the backplate, and an arm extending through the opening. The input portion is configured to drive the transfer link from a first transfer link position to a second transfer link position in response to the lockset transitioning from the first state to the second state. The indicator is positioned on the second side of the backplate and engaged with the actuating portion such that the indicator selectively displays a first indicium relating to the first state. Further embodiments, forms, features, and aspects of the present application shall become apparent from the description and figures provided herewith.

DETAILED DESCRIPTION OF ILLUSTRATIVE EMBODIMENTS

Figure 1:
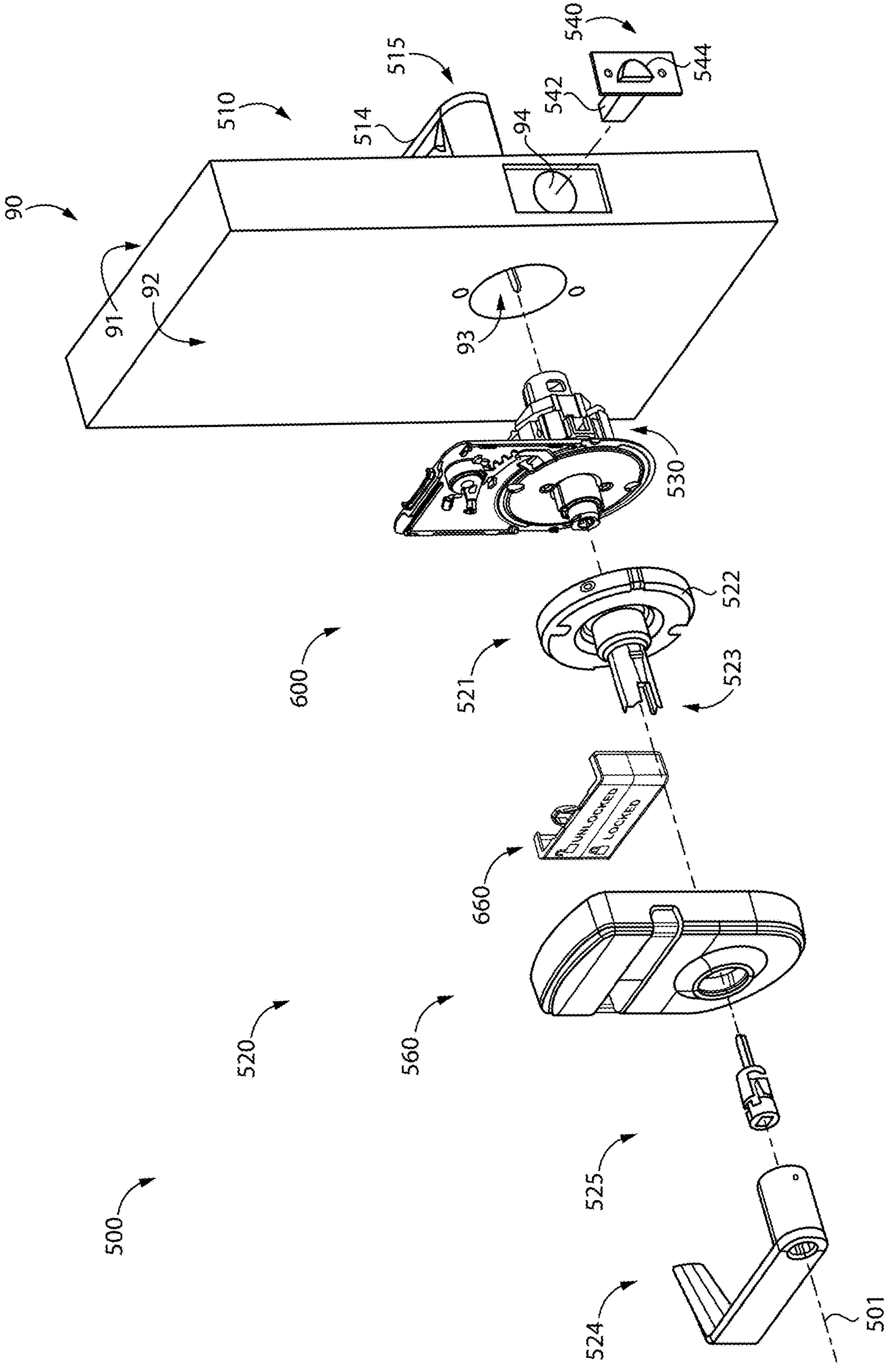
FIG. 1 is an exploded assembly view of a lockset according to certain embodiments installed to a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" may be used to denote motion or spacing along three mutually perpendicular axes, wherein each of the axes defines two opposite directions. These terms are used for case and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a lockset 500 according to certain embodiments installed to the door 90. While the illustrated lockset 500 is of a cylindrical format, it should be appreciated that the concepts described herein may be utilized in connection with locksets of other formats, such as tubular, mortise, and/or hybrid. The door 90 generally includes an inner or egress side 91, an outer or non-egress side 92, and a door preparation including a cross-bore 93 and a latch bore 94. The lockset 500 generally includes an inside assembly 510 mounted to the egress side 91, an outside assembly 520 mounted to the non-egress side 92, a chassis 530 seated in the cross-bore 93 and engaged with the inside assembly 510 and the outside assembly 520, and a latch mechanism 540 mounted in the latch bore 94 and engaged with the chassis 530. As described herein, the lockset 500 has a locked/unlocked state that defines whether the latch mechanism 540 can be actuated by an outside handle 524 of the outside assembly 520.

The inside assembly 510 is mounted to the egress side 91, and generally includes an inside spring cage, an inside handle 514 mounted to the inside spring cage for rotation about a longitudinal axis 501 of the lockset 500, and an inside lock state selector 515 operable to adjust the locked/unlocked state of the lockset 500 by causing movement of a control lug 535 of the chassis 530. While the illustrated inside handle 514 is provided in the form of a lever, it should be appreciated that the inside handle 514 may be provided in another form, such as that of a knob. In the illustrated form, the inside lock state selector 515 is provided in the form of a pushbutton having a projected position and a depressed position. It is also contemplated that the inside lock state selector 515 may take another form, such as that of a push-turn button, a turnpiece, or a lock cylinder. Additionally, while the illustrated lock state selector 515 is mounted in the inside handle 514, it should be appreciated that the lock state selector 515 may be mounted elsewhere.

The outside assembly 520 is mounted to the non-egress side 92, and generally includes an outside spring cage 521, an outside handle 524 mounted to the outside spring cage 521 for rotation about the longitudinal axis 501, an escutcheon 560, and an indicator assembly 600 mounted in the escutcheon 560. While the illustrated outside handle 524 is provided in the form of a lever, it should be appreciated that the outside handle 524 may be provided in another form, such as that of a knob. In the illustrated form, the outside assembly 520 further includes an outside lock state selector 525 operable to adjust the locked/unlocked state of the lockset 500. While the illustrated outside lock state selector 525 is provided in the form of a lock cylinder, it should be appreciated that the outside lock state selector 525 may be provided in another form, or may be omitted. For example, in certain embodiments, the outside lock state selector 525 may be provided in the form of an override mechanism, such as a recessed turn-button or a grenade-pin kickoff. The outside spring cage 521 generally includes a housing 522 and an outside drive spindle 523 rotatably mounted to the housing and coupled with the outside handle 524.

In the illustrated form, the indicator assembly 600 is provided to the outside assembly 520, and thus provides an indication of the locked/unlocked status of the lockset 500 to users on the non-egress side 92 of the door 90. It is also contemplated that the indicator assembly 600 may additionally or alternatively be provided to the inside assembly 510 to provide an indication of the locked/unlocked state to users on the egress side 91 of the door 90.

Figure 3:
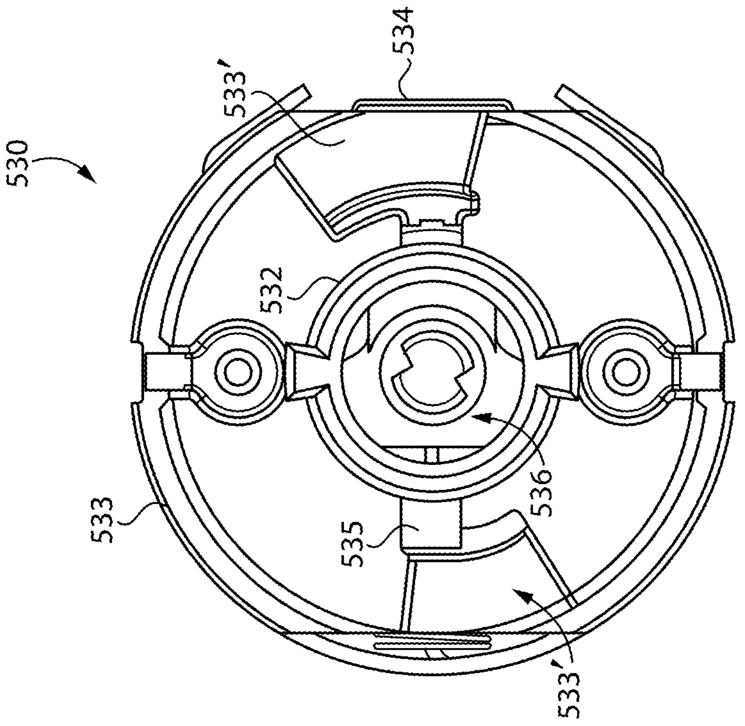
FIG. 3 is an end view of the chassis illustrated in FIG. 2.
Figure 2:
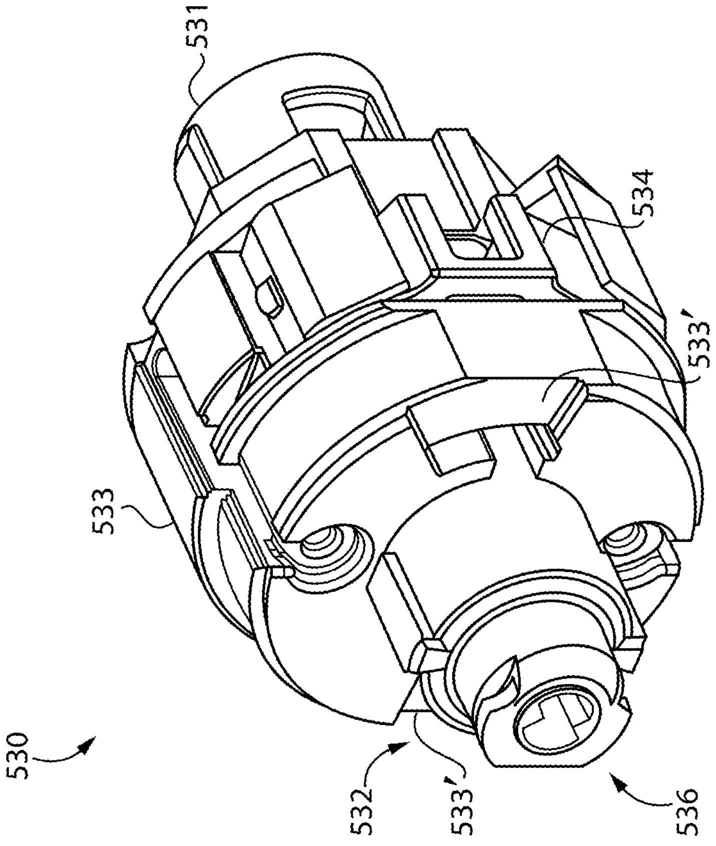
FIG. 2 is a perspective view of a chassis according to certain embodiments.

With additional reference to FIGS. 2 and 3, the chassis 530 is mounted in the cross-bore 93, and generally includes an inside chassis spindle 531, an outside chassis spindle 532, a body portion 533 to which the spindles 531, 532 are mounted for independent rotation, a shuttle 534 mounted in the body portion 533 for sliding movement transverse to the longitudinal axis 501, a control lug 535 mounted in the body portion 533 for sliding longitudinal movement, and a cam assembly 536 operable to move the control lug 535 between a locking position and an unlocking position to thereby adjust the locked/unlocked state of the lockset 500. The body portion 533 may include a recess 533' aligned with the control lug 535, and in the illustrated form includes a second recess 533' positioned such that the recesses 533' are diametrically opposite one another.

The inside chassis spindle 531 is operably connected with the inside assembly 510 such that the inside handle 514 is at least selectively operable to rotate the inside chassis spindle 531. Similarly, the outside chassis spindle 532 is operably connected with the outside assembly 520 such that the outside handle 524 is at least selectively operable to rotate the outside chassis spindle 532. The shuttle 534 is engaged with each of the chassis spindles 531, 532 such that each of the spindles 531, 532 is independently operable to drive the shuttle 534 from an extended or unactuated position to a retracted or actuated position. As described herein, the shuttle 534 is also engaged with the latch mechanism 540 such that retraction of the shuttle 534 actuates the latch mechanism 540.

The control lug 535 has a locking/unlocking position corresponding to the locked/unlocked state of the lockset 500. Stated another way, the control lug 535 has a locking position corresponding to the locked state, and an unlocking position corresponding to the unlocked state. The control lug 535 in the locking position prevents the outside handle 524 from retracting the shuttle 534 and actuating the latch mechanism 540, while the control lug 535 in the unlocking position permits the outside handle 524 to retract the shuttle 534 and actuate the latch mechanism 540.

The cam assembly 536 is engaged with the control lug 535 and is configured to move the control lug 535 between its locking position and its unlocking position in response to an actuating input. In certain embodiments, the cam assembly 536 is configured to move the control lug 535 from its unlocking position to its locking position in response to a locking actuation of the inside lock state selector 515. As one example, the cam assembly 536 may longitudinally drive the control lug 535 from its unlocking position to its locking position in response to depression of a pushbutton. In certain embodiments, the cam assembly 536 is configured to move the control lug 535 from its locking position to its unlocking position in response to an unlocking actuation of the outside lock state selector 525. As one example, the cam assembly 536 may longitudinally move the control lug 535 from its locking position to its unlocking position in response to actuation of a lock cylinder. Cam assemblies of this type are known in the art, and need not be described in further detail herein.

In certain embodiments, the chassis 530 may be configured to provide a “freewheel” locking state in which the outside handle 524 is at all times free to rotate between its home position and its actuated position. In such forms, the control lug 535 in the locking position may decouple the outside handle 524 from the outside chassis spindle 532 to prevent actuation of the shuttle 534, and may in the unlocking position may couple the outside handle 524 to the chassis spindle 532 for transmission of rotation between the outside chassis spindle 532 and the outside handle 524.

In certain embodiments, the chassis 530 may be configured to provide a “locked stationary” locking state in which the outside handle 524 is free to rotate only when the lockset 500 is in the unlocked state. For example, the control lug 535 may rotationally lock the outside handle 524 to the body portion 533 when in the locking position, and may rotationally decouple the outside handle 524 from the body portion 533 to permit rotation of the outside handle 524 for retraction of the shuttle 534 when in the unlocking position.

The latch mechanism 540 is seated in the latch bore 94, and generally includes a housing 542 and a latchbolt 544 movably mounted in the housing 542. The latch mechanism 540 is engaged with the shuttle 534 such that the latchbolt 544 retracts in response to retraction of the shuttle 534.

Figure 5:
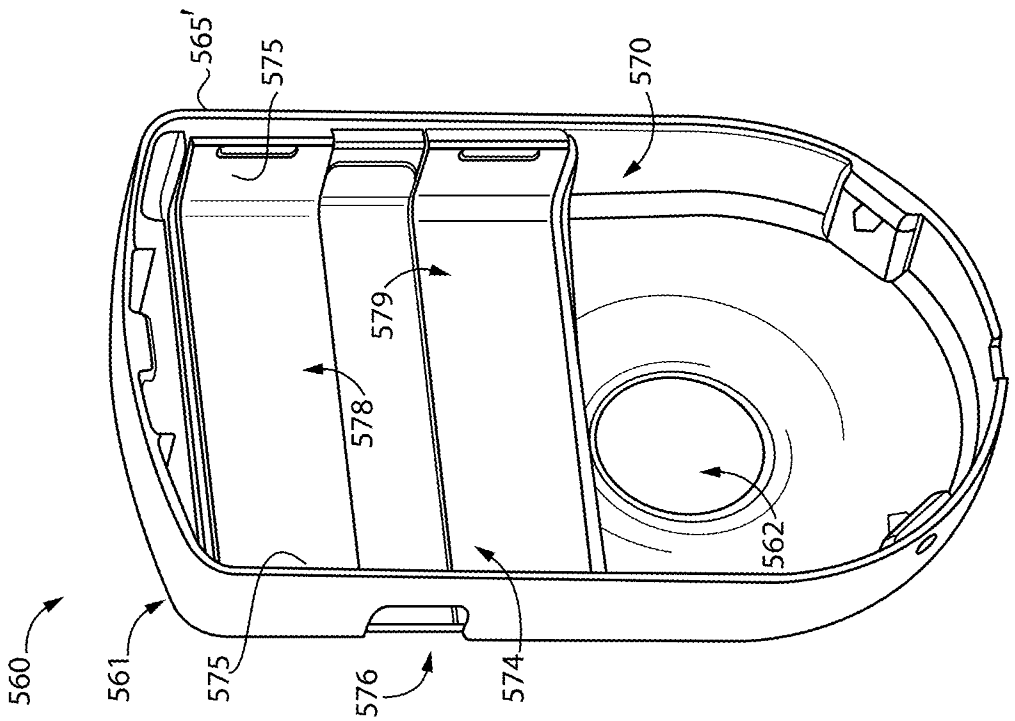
FIG. 5 is a rear perspective illustration of the escutcheon illustrated in FIG. 4.
Figure 4:
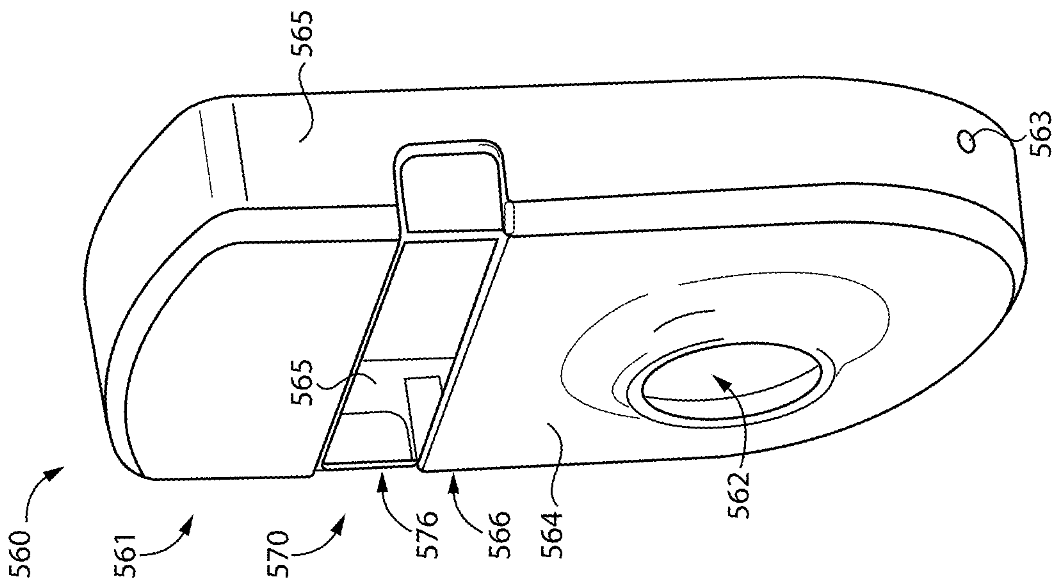
FIG. 4 is a front perspective illustration of an escutcheon according to certain embodiments.

With additional reference to FIGS. 4 and 5, the escutcheon 560 generally includes a housing 561 and a transparent or translucent shield 570. The housing 561 includes a spindle aperture 562 through which the drive spindle 523 extends, a front wall 564, sidewalls 565, and a window 566 through which a portion of the indicator sign 660 is visible. In the illustrated form, the window 566 extends across the front wall 564 and into each of the sidewalls 565. As described herein, these features may facilitate the viewing of the locked/unlocked status indication across a greater viewing angle. However, it should be appreciated that the window 566 may take another form, such as one that is confined to the front wall 564. In certain forms, the housing 561 may include a fastener aperture 563 operable to receive a fastener (e.g., a set screw) by which the housing 561 may be secured to the spring cage housing 522 to prevent rotation of the escutcheon 560 relative to the door 90.

The shield 570 is positioned at least partially within the housing 561, and generally includes a front panel 574, a pair of side panels 575 that project rearward from the front panel 574, and a viewing area 576 that is aligned with the window 566. In certain embodiments, the viewing area 576 may be raised relative to the remainder of the front panel 574 such that material of the shield 570 projects into the window 566. In certain embodiments, the shield 570 may be formed of a transparent or translucent material. For example, the shield 570 may be formed of clear polycarbonate. In certain forms, the housing 561 may include one or more lips 565', which may abut the rear edges of the side panels 575 to restrict longitudinal movement of the shield 570 relative to the housing 561.

While other forms are contemplated, in the illustrated embodiment, the shield 570 is significantly larger than the window 566, and includes an upper portion 578 above the window 566 and a lower portion 579 below the window 566. In certain embodiments, each of the upper portion 578 and the lower portion 579 may have a corresponding and respective height in the range of 0.5 inch to 5.5 inch.

The enlarged size of the shield 570 compared to the window 566 may serve one or more functions that may be desirable in certain embodiments. For example, the greater amount of material may improve part stiffness to resist deflection. In certain forms, the side panels 575 may abut a baseplate 610 of the indicator assembly 600 to further resist deflection, for example in the event that a user presses on the front face of the viewing area 576. Sidewall support from the baseplate 610 may additionally or alternatively resist squeezing of the viewing area 576 from the sides. Additionally or alternatively, the shield 570 may prevent the indicator sign 660 from rubbing against the rear side of the housing 560 as the sign 660 moves throughout its standard movement range. This may provide a consistent and smooth bearing surface that surrounds the indicator sign 660 and facilitates the movement thereof.

Figure 6:
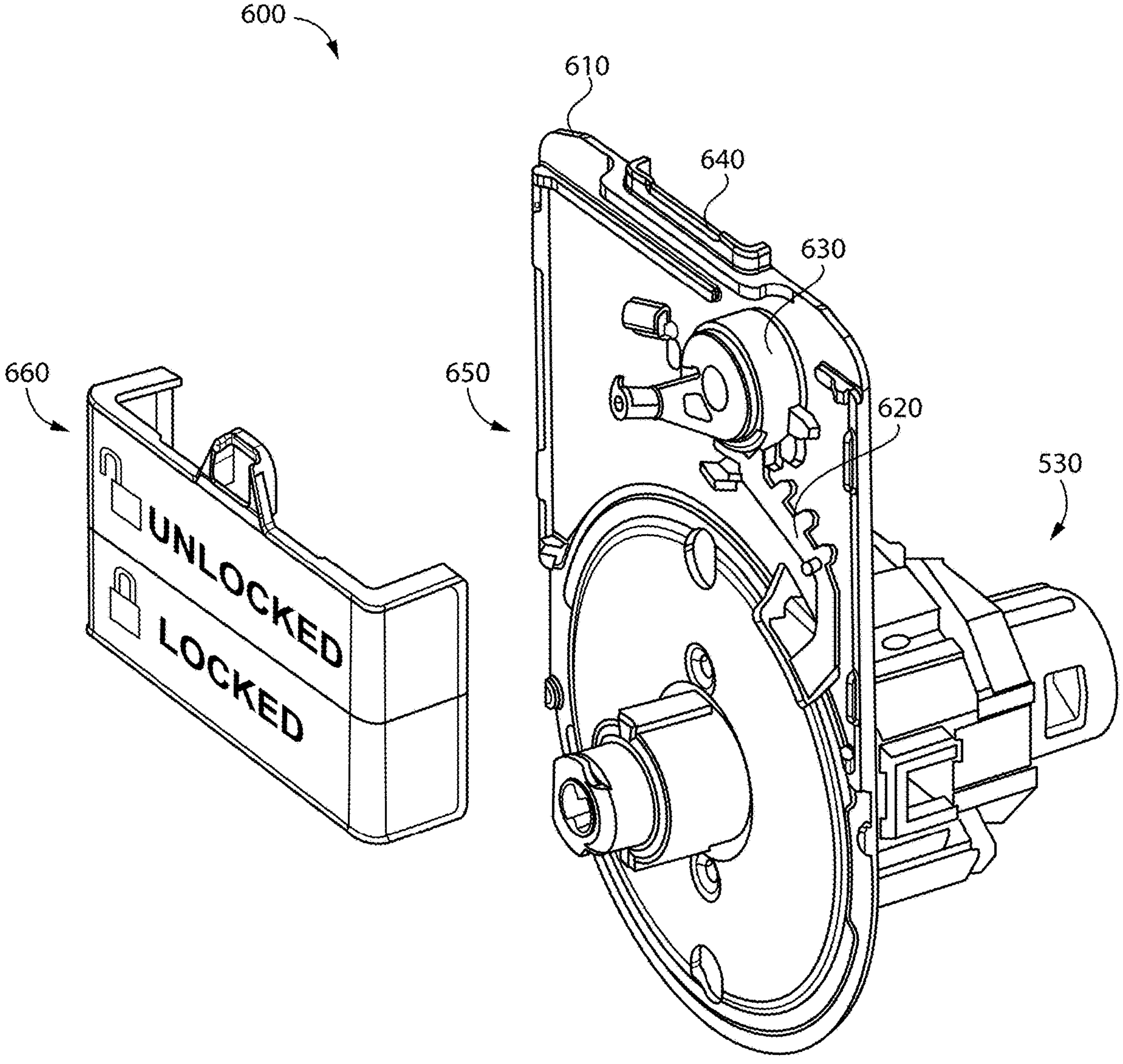
FIG. 6 is a partially exploded assembly view of an indicator assembly according to certain embodiments.
Figure 7:
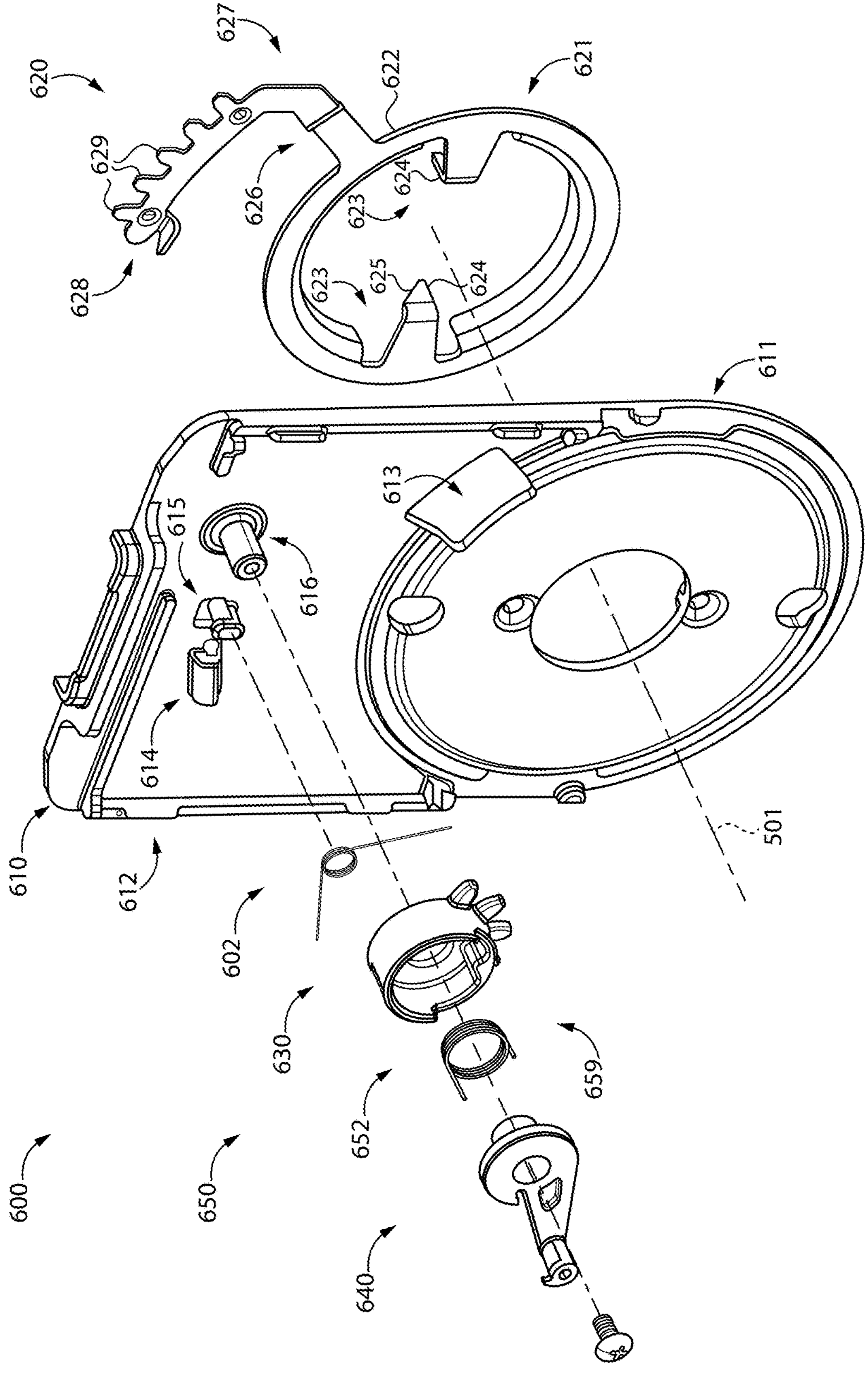
FIG. 7 is an exploded assembly view of a portion of the indicator assembly illustrated in FIG. 6.

With additional reference to FIGS. 6 and 7, the indicator assembly 600 generally includes a baseplate 610, a transfer link 620 mounted for rotation relative to the baseplate 610, a transmission 650 engaged with the transfer link 620, and an indicator sign 660 engaged with the transmission 650. In certain embodiments, the indicator assembly 600 may include a return spring 602 that biases the transfer link 620 toward a home position, such as a first transfer link position.

While other forms are contemplated, in the illustrated form, the transmission 650 generally includes a lever gear 630, a lever arm 640, and an anti-jam spring 652. As described herein, the lever gear 630 is rotatably mounted to the baseplate 610 and engaged with the transfer link 620, the lever arm 640 is operable to be rotated by the lever gear 630, and the indicator sign 660 is engaged with the lever arm 640. Additionally, the anti-jam spring 652 is engaged between the lever gear 630 and the lever arm 640, and may enable movement of one or more first components of the indicator assembly 600 (e.g., the transfer link 620 and/or the lever gear 630) even when one or more second components of the indicator assembly 600 (e.g., the lever arm 640 and/or the indicator sign 660) are jammed or blocked from movement.

The baseplate 610 provides a base to which one or more other components of the indicator assembly 600 may be mounted, and has a door-facing first side 611 and an outward-facing second side 612. The baseplate 610 also includes an aperture 613 through which an armature 626 of the transfer link 620 extends. Extending from the outward-facing side 612 are a flange 614, a projection 615, and a post 616. As described herein, the flange 614 provides an anchor point for the return spring 602, which may be mounted to the projection 615. Additionally, the post 616 provides a mounting location for the transmission 650.

The illustrated transfer link 620 includes a generally annular body portion 622, and at least one arm 623 extending radially inward from the body portion 622. Each arm 623 includes a radially-extending portion and a longitudinally extending finger 624, the latter of which includes a ramp 625. The illustrated transfer link 620 also includes an armature 626 that extends radially outward from the body portion 622 to an actuating portion 627. In the illustrated form, the actuating portion 627 includes a first gear segment 628 including a plurality of first teeth 629. While other forms are contemplated, in the illustrated embodiment, the body portion 622 is positioned on the door-facing first side 611 of the baseplate 610, the gear segment 628 is positioned on the outward-facing second side 612 of the baseplate 610, and the armature 626 extends through the aperture 613 to facilitate positioning of the body portion 622 and the gear segment 628 on opposite sides of the baseplate 610.

As described herein, a portion of the transfer link 620 positioned on the baseplate first side 611 is configured to be actuated by the chassis 530, and may be referred to herein as an input portion 621. While at least one example of an input portion 621 is described herein, it should be appreciated that other forms of input portions may be utilized. Typically, an input portion is configured to cause movement of the transfer link 620 between its first and second positions in response to a transition of the lockset 500 between a first state and a second state (e.g., a locked state and an unlocked state). For example, an input portion may be actuated by engagement of a ramp with the control lug 535.

In the illustrated form, the first gear segment 628 is indirectly connected with the indicator sign 660, and actuates the indicator sign 660 between its first and second positions. Accordingly, the gear segment 628 may be referred to herein as at least partially defining an actuating portion 627. While at least one example of an actuating portion 627 is described herein, it should be appreciated that the actuating portion may take another form. For example, the actuating portion 627 may be engaged with the transmission 650 via a mechanism other than gear teeth, or may be directly engaged with an indicator. It should further be appreciated that although the transfer link 620 is illustrated in connection with a mechanical indicator sign 660, the concepts described herein may be utilized in connection with other forms of indicators, such as electronic ink displays, light emitting diode (LED) displays, liquid crystal displays (LCDs), lights, buzzers, speakers, or another form of visual and/or audible indicator.

Figure 8:
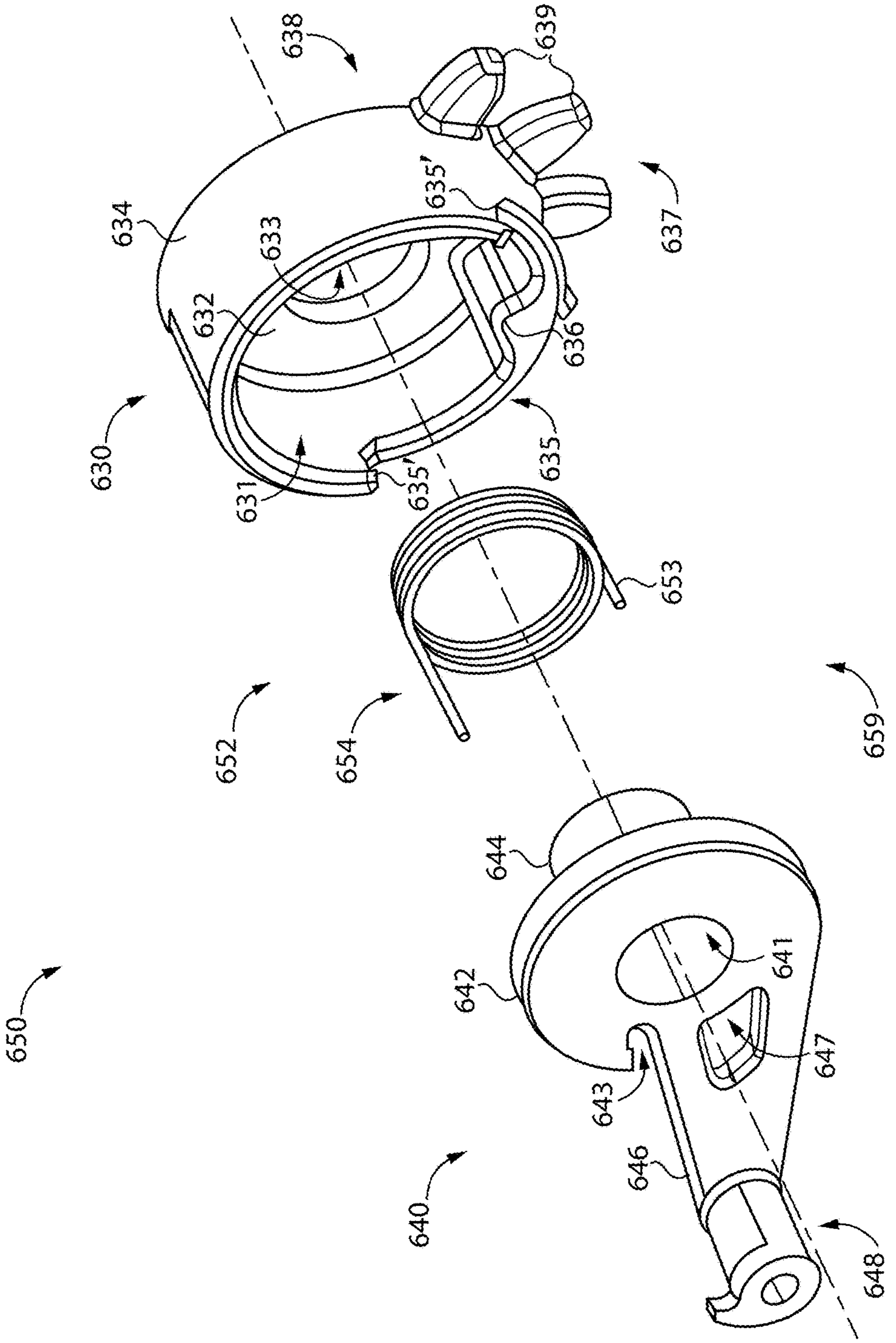
FIG. 8 is an exploded assembly view of a transmission according to certain embodiments.

With additional reference to FIG. 8, the illustrated transmission 650 generally includes a lever gear 630, a lever arm 640 connected with the lever gear 630 via a lost rotational motion connection 659, and an anti-jam spring 652 engaged between the lever gear 630 and the lever arm 640. As described herein, the lost rotational motion connection 659 permits a certain degree of relative motion of the lever gear 630 and lever arm 640, and the anti-jam spring 652 generates a rotational biasing force on one of the lever gear 630 or the lever arm 640 in response to rotation of the other of the lever gear 630 or the lever arm 640.

The lever gear 630 generally includes a base 632, a generally annular wall 634 projecting from the base 632 to thereby define a cavity 631, a ridge 636 projecting inward from the annular wall 634, and an input portion 637 engaged with the actuating portion 627. In the illustrated form, the input portion 637 includes a second gear segment 638 including a plurality of second teeth 639. The lever gear 630 is rotatably mounted to the post 616, which extends through an aperture 633 in the base 632 and defines a first pivot axis for the lever gear 630. A portion of the annular wall 634 is recessed to thereby define an arcuate recess 635, and the ridge 636 is aligned with the arcuate recess 635. The arcuate recess 635 is bounded by edges 635' that partially define the lost rotational motion connection 659 between the lever gear 630 and the lever arm 640. As described in further detail below, the second gear segment 638 is meshed with the first gear segment 628 such that the lever gear 630 performs or undergoes a first lever gear movement (e.g., rotation between a first lever gear position and a second lever gear position) in response to a first transfer link (e.g., rotation of the transfer link 620 between a first transfer link position and a second transfer link position).

The lever arm 640 generally includes a base 642, a post 644 extending rearward from the base 642, an arm 646 extending radially from the base 642, and a finger 648 extending longitudinally from an end portion of the arm 646. In the illustrated form, the base 642 includes a notch 643, which may receive one leg 654 of the anti-jam spring 652 to thereby anchor one end of the anti-jam spring 652 to the lever arm 640. In certain forms, the arm 646 may include an aperture 647. As described herein, the finger 648 is engaged with the indicator sign 660 such that the sign 660 moves between a first indicator position and a second indicator position in response to rotation of the lever arm 640 between a first lever arm position and a second lever arm position.

As depicted in FIG. 8, the illustrated transmission 650 generally includes the lever gear 630, the lever arm 640, and the anti-jam spring 652, which is engaged between the lever gear 630 and the lever arm 640. The lever gear 630 and the lever arm 640 are engaged with one another through the lost rotational motion connection 659 such that, in the absence of the anti-jam spring 652, the lever gear 630 and the lever arm 640 are free to rotate relative to one another. With the anti-jam spring 652 engaged between the lever gear 630 and the lever arm 640, rotation of one of the lever gear 630 or the lever arm 640 causes the anti-jam spring 652 to generate a biasing force that urges the other of the lever gear 630 or the lever arm 640 to perform a corresponding rotational movement.

In the illustrated embodiment, the anti-jam spring 652 is provided in the form of a torsion spring, of which a first leg 653 is engaged with the lever gear 630 (e.g., via the ridge 636), and of which a second leg 654 is engaged with the lever arm 640 (e.g., via the notch 643). It is also contemplated that the anti-jam spring 652 may be provided in another form, such as one including a compression spring, an extension spring, a leaf spring, an elastic member, or another form of biasing member. As described herein, the anti-jam spring 652 is generally configured to urge the lever arm 640 to rotate in response to rotation of the lever gear 630.

During operation of the transmission 650, a first rotation of the lever gear 630 between a first lever gear position and a second lever gear position (e.g., in response to rotation of the transfer link 620 between a first transfer link position and a second transfer link position as described herein) causes the anti-jam spring 652 to exert a corresponding rotational biasing force on the lever arm 640. When the lever arm 640 is not blocked from rotation, this biasing force causes the lever arm 640 to rotate between a first lever arm position and a second lever arm position. However, when the lever arm 640 is blocked from rotation (e.g., by the indicator sign 660 being jammed), the anti-jam spring 652 deforms in response to rotation of the lever gear 630, thereby storing mechanical energy and permitting the lever gear 630 to rotate when the lever arm 640 is blocked from movement. Should the blocking force be removed while the spring 652 is deformed, the spring 652 will release the stored mechanical energy and drive the lever arm 640 to the lever arm position corresponding to the current lever gear position. These features may additionally or alternatively allow the lockset 600 to function correctly when the sign is jammed. For example, if the lockset 600 were in the unlocked state while the sign 660 were jammed, the lost motion would nonetheless enable the user to transition the lockset 600 to its locked state.

In the illustrated form, the transmission 650 is a multipiece mechanism in which a lost rotational motion connection 659 and an anti-jam spring 652 permit rotation of the lever gear 630 (and thus of the transfer link 620) even when the lever arm 640 and/or the sign 660 is jammed. It should be appreciated, however, that in other embodiments, the transmission 650 may be formed of one or more components that directly correlate movement of the sign 660 with rotation of the transfer link 620.

Figure 9:
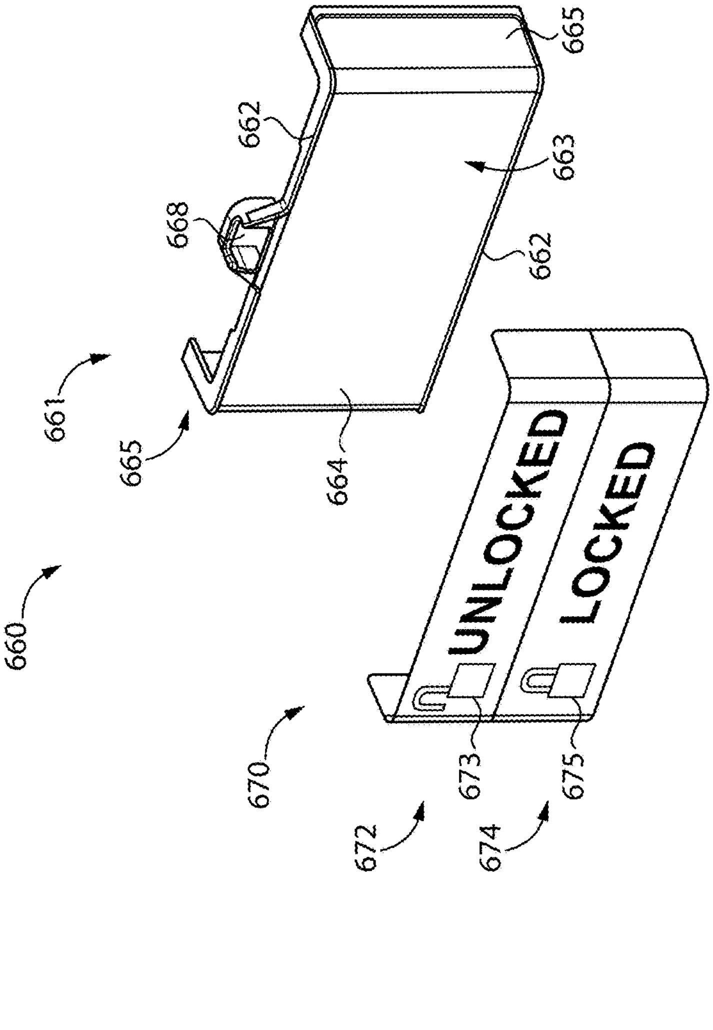
FIG. 9 is an exploded assembly view of an indicator sign according to certain embodiments.

With additional reference to FIG. 9, illustrated therein is an example form of indicator sign 660. The illustrated indicator sign 660 generally includes a frame 661 and a label 670. The frame 661 includes a front wall 664 that faces the shield 570, a pair of sidewalls 665 extending rearward from the front wall 664, and an opening 668 configured to receive the finger 648 of the lever arm 640. The label 670 generally includes a first indicating region 672 including first indicia 673 relating to a first state of the lockset 500 (e.g., the unlocked state), and a second indicating region 674 including second indicia 675 relating to a second state of the lockset 500 (e.g., the locked state). The label 670 is sized and shaped to extend across the front wall 664 and onto the sidewalls 665 such that each sidewall 665 includes a corresponding and respective portion of each indicating region 672, 674.

In certain embodiments, the frame 661 may include one or more lips 662 that define a slightly recessed area 663 in which the label 670 is seated. Such lip(s) 662 may provide a protective standoff for the label 670 to thereby discourage the label 670 from rubbing against the rear side of the shield 570 as the sign 660 moves between its first and second positions.

The indicator sign 660 is mounted in the escutcheon 560 for movement between a first indicator sign position and a second indicator sign position. While other forms are contemplated, in the illustrated form, the indicator sign 660 is mounted for vertical movement between the first indicator sign position and the second indicator sign position. When the indicator sign 660 is in the first indicator sign position, the first indicating region 672 is aligned with the window 566 such that the first indicia 673 are visible through the viewing area 576. When the indicator sign 660 is in the second indicator sign position, the second indicating region 674 is aligned with the window 566 such that the second indicia 675 are visible through the viewing area 576. As described herein, the indicator assembly 600 is configured to move the indicator sign 660 between its first and second positions in response to movement of the control lug 535 between its locking position and its unlocking position.

As noted above, the illustrated indicator sign 660 is provided as a multi-piece construction, in which a label 670 is adhered to a frame 661 to thereby define the indicator sign. This arrangement may provide one or more advantages. As one example, the multi-piece construction may enable the frame 661 to be formed separately from the indicia-bearing component (e.g., the label 670), thereby allowing virtually any desired geometry to be molded into the frame 661 without concern about introducing cosmetic defects into the indicator sign graphics. In certain embodiments, the frame 661 may be formed of a resin having properties that are preferred for a functional part.

In the illustrated form, each indicating region 672, 674 includes plural indicia, each relating to the corresponding state of the lockset 500. For example, the first indicating region 672 includes one or more first indicia 673, which in the illustrated form includes a first symbol (an unlocked padlock), a first word ("UNLOCKED") and a first background color (white). Each of the first indicia 673 may serve to indicate to the user that the lockset 500 is unlocked when the first indicating region 672 is aligned with the window 566. Similarly, the second indicating region 674 includes one or more second indicia 675, which in the illustrated form includes a second symbol (a locked padlock), a second word ("LOCKED"), and a second background color (red). Each of the second indicia 675 may serve to indicate to the user that the lockset 500 is locked when the second indicating region 674 is aligned with the window 566. It should be appreciated, however, that additional and/or alternative forms of indicia may be used in connection with the first indicating region 672 and/or the second indicating region 674.

Figure 10:
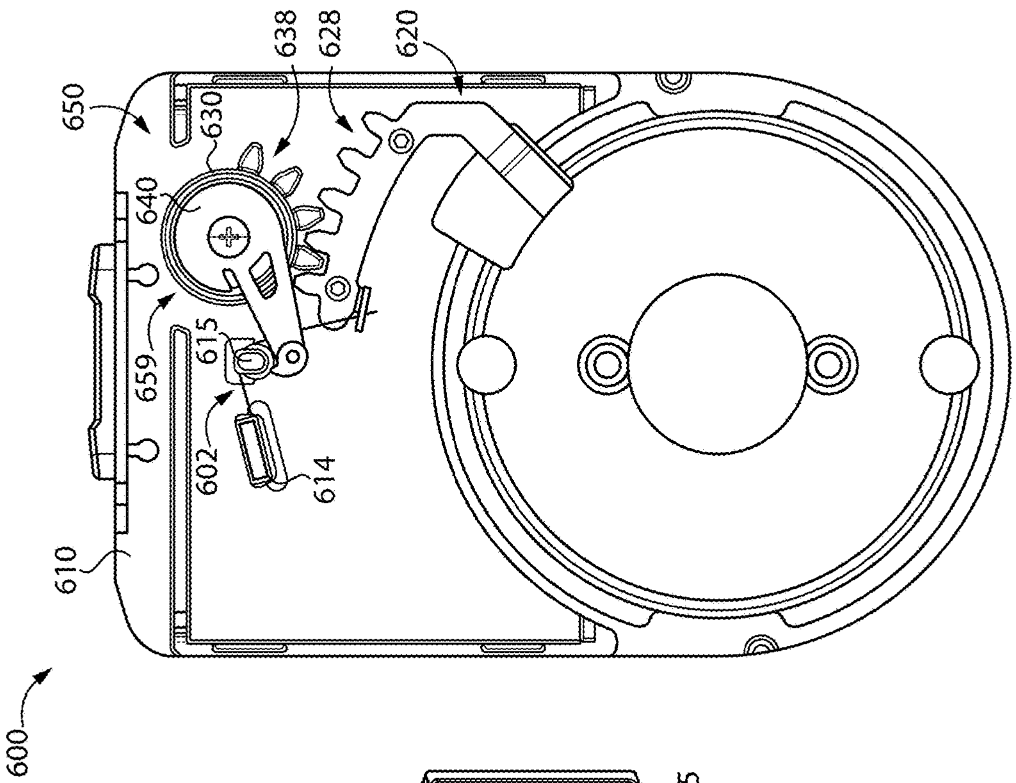
FIG. 10 is a plan view of a portion of the indicator assembly illustrated in FIG. 6.

With additional reference to FIG. 10, illustrated therein is a partially-assembled configuration of the indicator assembly 600, in which the indicator sign 660 is omitted for clarity. In the illustrated configuration, each of the transfer link 620, the lever gear 630, and the lever arm 640 is in its corresponding and respective first position. In certain embodiments, one or more of these components may be biased to its first position. For example, a return spring 602 may be engaged with the transfer link 620 to thereby bias the transfer link 620 to its first position, thereby biasing the transmission 650 to its first position. In the illustrated embodiment, the return spring 602 is a torsion spring that is mounted to the projection 615, and has one leg engaged with the flange 614 and another leg engaged with the transfer link 620. It is also contemplated that the return spring may take another form, such as one involving the use of a compression spring, a leaf spring, an extension spring, an elastic member, and/or magnets.

Figure 12:
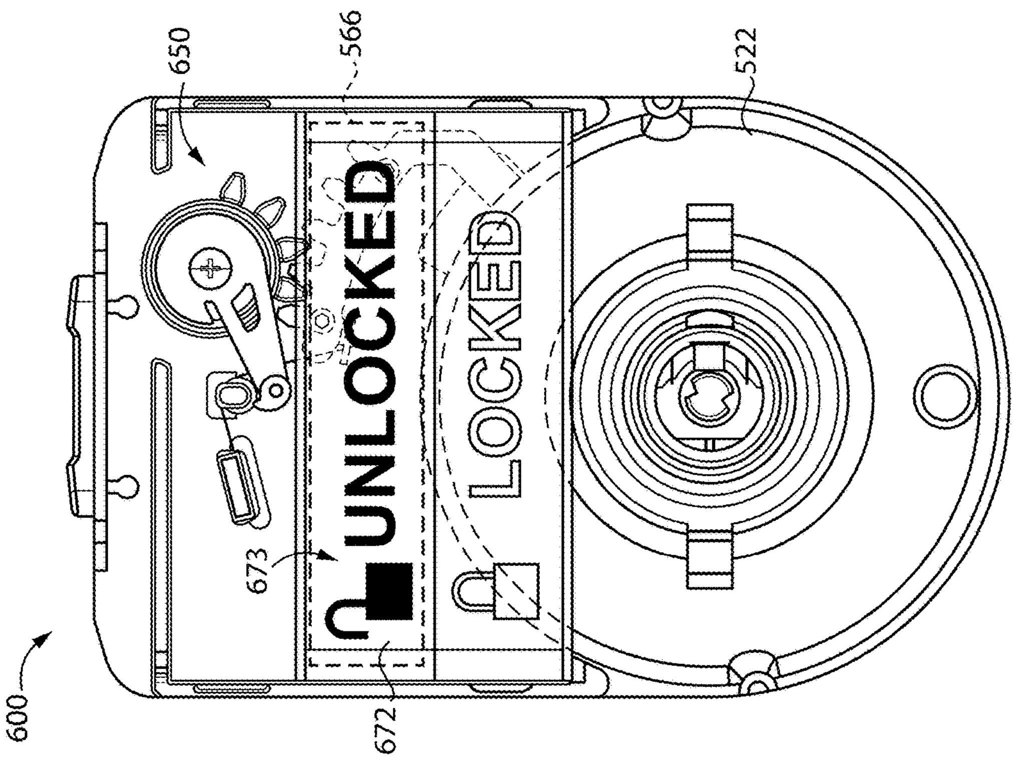
FIG. 12 is a plan view of the indicator assembly illustrated in FIG. 6 with the lockset illustrated in FIG. 1 in the unlocked state.
Figure 11:
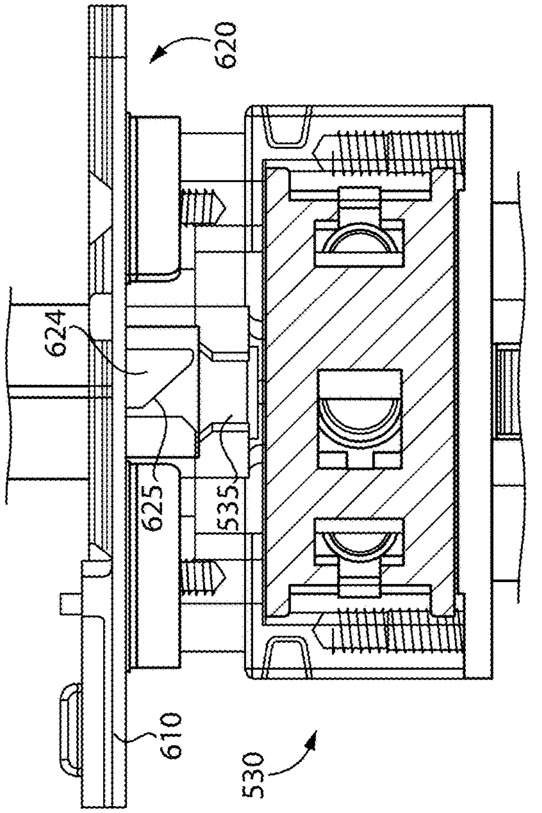
FIG. 11 is a top-down view of a portion of the lockset illustrated in FIG. 1 in an unlocked state.

With additional reference to FIGS. 11 and 12, illustrated therein are illustrative portions of the lockset 500 with the lockset 500 in its unlocked state. In this state, the control lug 535 is in its unlocked position and is disengaged from the finger 624, thereby permitting the return spring 602 to retain the transfer link 620 in its first or home position. As a result, the transmission 650 is in the first transmission position, in which the transmission 650 places the indicator sign 660 in the first indicator sign position to thereby align the first indicating region 672 with the window 566. Accordingly, the indicator assembly 600 displays the first indicia 673 while the second indicia 675 are obscured from view, thereby providing a clear indication to the user that the lockset 500 is unlocked.

While other forms are contemplated, in the illustrated embodiment, the indicator sign 660 overlaps or covers a portion of the spring cage 521 in at least one of the first position or the second position. Such overlapping of the sign 660 with the spring cage 521 may provide one or more advantages, such as enabling a smaller vertical footprint for the escutcheon 560. It should be appreciated, however, that in other embodiments the sign 660 may not necessarily overlap or partially cover the spring cage 521.

Figure 14:
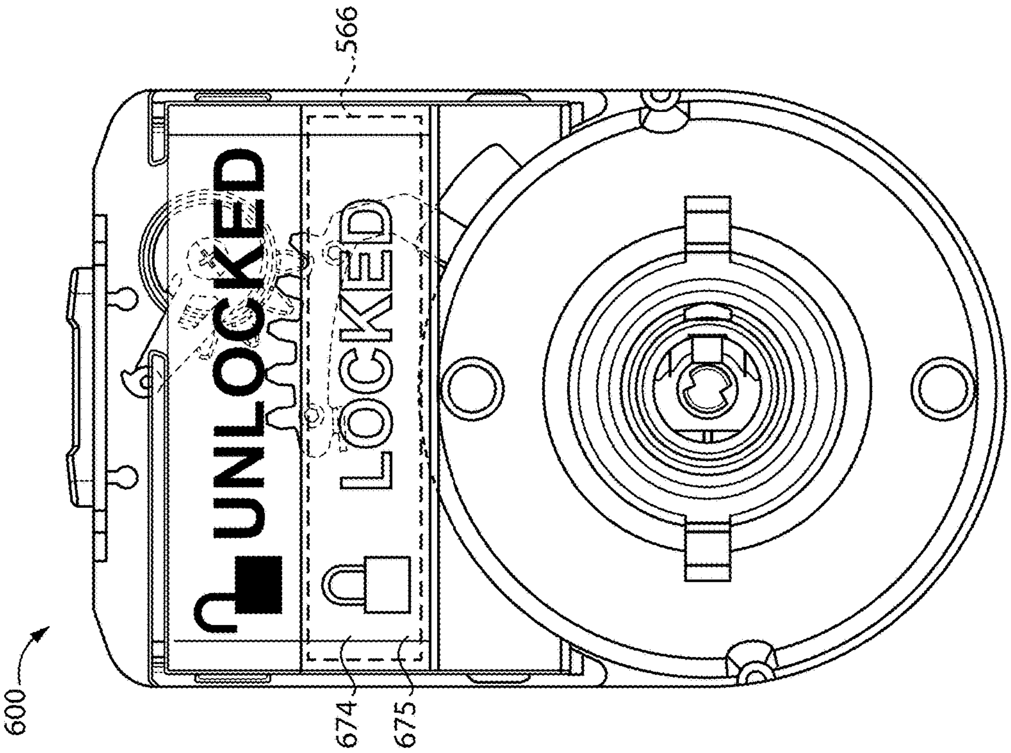
FIG. 14 is a plan view of the indicator assembly illustrated in FIG. 6 with the lockset illustrated in FIG. 1 in the locked state.
Figure 13:
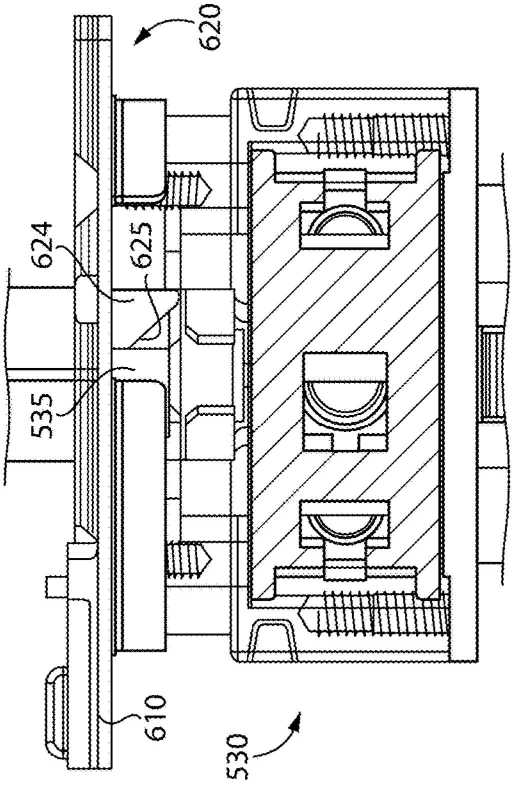
FIG. 13 is a top-down view of a portion of the lockset illustrated in FIG. 1 in a locked state.

With additional reference to FIGS. 13 and 14, in order to transition the lockset 500 to its locked state, the user may actuate a lock state selector of the lockset 500 (e.g., the inside lock state selector 515 and/or the outside lock state selector 525). Such actuation of the lock state selector moves the control lug 535 to its locking position (FIG. 13), thereby causing the control lug 535 to engage the ramp 625 and drive the transfer link 620 from its home or first position to its rotated or second position. Such rotation of the transfer link 620 causes a corresponding rotation of the lever gear 630 due to the engaged gear segments 628, 638, thereby moving the lever gear 630 from the first lever gear position to the second lever gear position. Provided that the lever arm 640 is not jammed, rotation of the lever gear 630 is transmitted via the anti-jam spring 652 to the lever arm 640 as described above, thereby moving the lever arm 640 from the first lever arm position to the second lever arm position. This pivotal movement of the lever arm 640 is transmitted to the indicator sign 660 via the engagement of the finger 648 with the opening 668, thereby moving the indicator sign 660 from the first indicator sign position to the second indicator sign position. With the indicator sign 660 in its second position, the second indicating region 674 is aligned with the window 566, thereby providing a clear indication to the user that the lockset 500 is locked.

As will be appreciated, transitioning the lockset 500 from its locked state to its unlocked state involves moving the control lug 535 from its locking position (FIG. 13) to its unlocking position (FIG. 11), thereby permitting the transfer link 620 to return to its home position under the biasing force of the return spring 602. This in turn causes the transmission 650 to return the indicator sign 660 to its first position such that the indicator assembly 600 once again displays the first indicia 673.

As noted above, the illustrated chassis 530 includes a pair of diametrically-opposite recesses 533'. Each recess 533' receives a corresponding and respective one of the fingers 624, and is sized and shaped to permit the corresponding finger 624 to move within the recess 533' during rotation of the transfer link 620 between its first and second positions. The provision of two recesses 533' may, for example, facilitate handing of the lockset 500. For example, when the lockset 500 is in a first handing configuration, a first of the fingers 624 may be seated in a first of the recesses 533' such that the control lug 535 is operable to rotate the transfer link 620 via engagement with the first finger 624, while the second finger 624 is seated in the second recess 533'. In order to adjust the lockset 500 to a second handing configuration, the user may place the chassis 530 in an orientation that is rotated 180° about the longitudinal axis 501 from the orientation the chassis 530 occupies in the first handing configuration. In the second handing configuration, the first finger 624 is seated in the second recess 533' and the second finger 624 is seated in the first recess 533' such that the control lug 535 is operable to rotate the transfer link 620 via engagement with the second finger 624.

Figure 15:
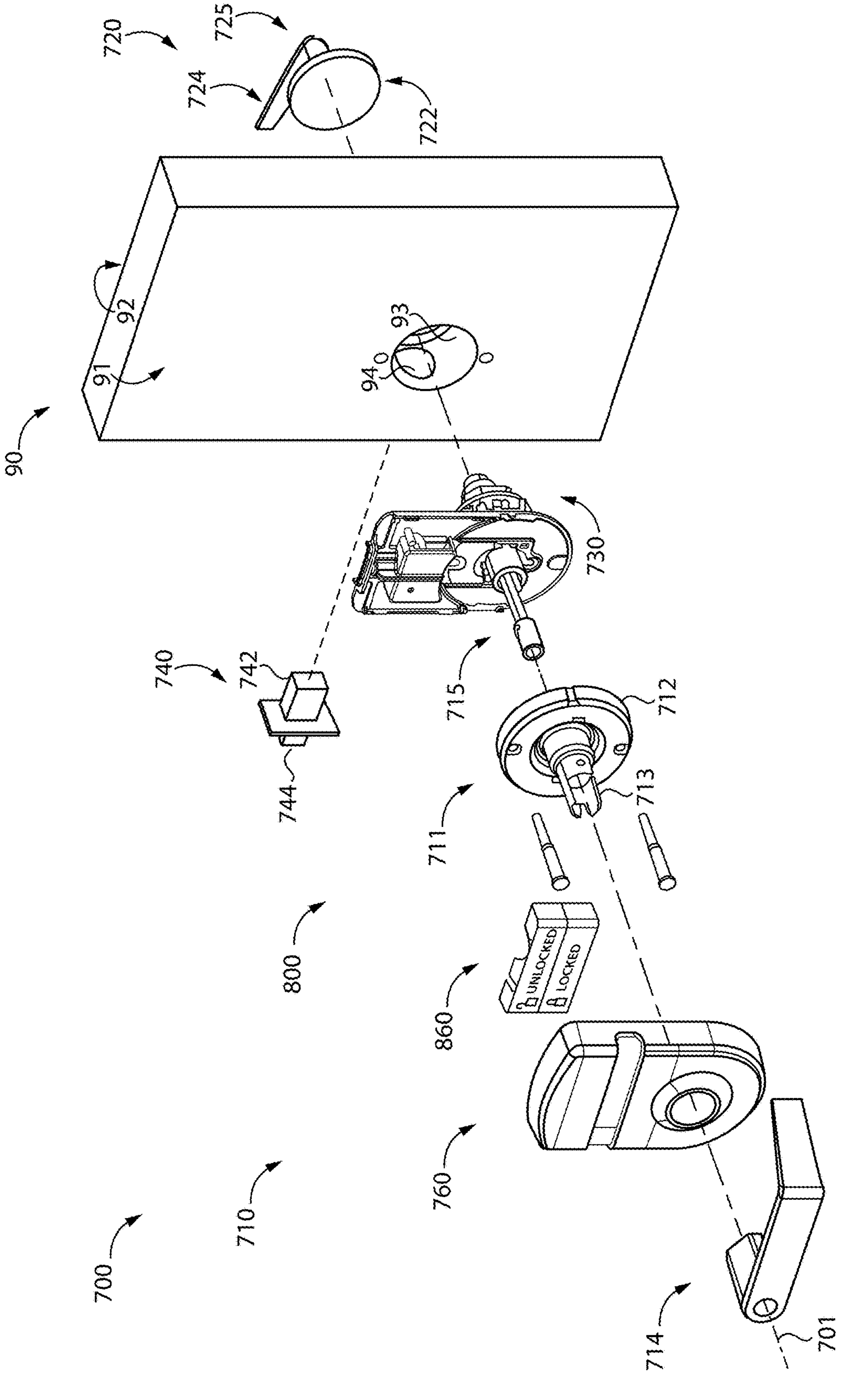
FIG. 15 is an exploded assembly view of a lockset according to certain embodiments installed to a door.

With additional reference to FIG. 15, illustrated therein is a lockset 700 according to certain embodiments installed to the door 90. While the illustrated lockset 700 is of a cylindrical format, it should be appreciated that the concepts described herein may be utilized in connection with locksets of other formats, such as tubular, mortise, and/or hybrid. As noted above, the door 90 generally includes a first side 91, a second side 92, and a door preparation including a cross-bore 93 and a latch bore 94. One of the first side 91 or the second side 92 is an egress or inner side of the door 90, while the other of the first side 91 or the second side 92 is a non-egress or outer side of the door 90.

The lockset 700 generally includes a first handleset 710 mounted to the first side 91 of the door 90, a second handleset 720 mounted to the second side 92 of the door 90, a chassis 730 seated in the cross-bore 93 and engaged with the first handleset 710 and the second handleset 720, and a latch mechanism 740 mounted in the latch bore 94 and engaged with the chassis 730. As described herein, the lockset 700 has a locked/unlocked state that defines whether the latch mechanism 740 can be actuated by an outside handle of the lockset 700, and the locked/unlocked state of the lockset 700 is defined by the locking/unlocking position of a control lug 735 of the chassis 730.

The illustrated lockset 700 includes an indicator assembly 800 that, as described herein, is configured to display a visual indication regarding the locked/unlocked state of the lockset 700, and which changes the displayed visual indication in response to an actuating movement transmitted by the chassis 730. In the illustrated form, the first handleset 710 includes the indicator assembly 800. It should be appreciated, however, that an indicator assembly 800 may additionally or alternatively be provided to the second handleset 720.

As noted above, the indicator assembly 800 is configured to change states in response to an actuating movement transmitted by the chassis 730. In certain embodiments, an indicator assembly 800 may be positioned on a first side of the chassis 730 (e.g., the egress or inner side of the chassis 730) such that the indicator assembly 800 can be actuated by a first moving component of the chassis 730. Additionally or alternatively, an indicator assembly 800 may be positioned on an opposite second side of the chassis 730 (e.g., the non-egress or outer side of the chassis 730) such that the indicator assembly 800 can be actuated by a different moving component of the chassis 730. In certain embodiments, the chassis 730 may be operable to actuate each and either of an interior indicator assembly and an exterior indicator assembly.

The first handleset 710 is mounted to the first side 91 of the door 90, and generally includes a first spring cage 711, a first handle 714 mounted to the first spring cage 711 for rotation about a longitudinal axis 701 of the lockset 700, a first lock state selector 715 operable to adjust the locked/unlocked state of the lockset 700, an escutcheon 760, and an indicator assembly 800 mounted in the escutcheon 760. The first spring cage 711 generally includes a spring cage housing 712 and a first drive spindle 713 rotatably mounted to the housing 712 and coupled with the first handle 714. While the illustrated first handle 714 is provided in the form of a lever, it should be appreciated that the first handle 714 may be provided in another form, such as that of a knob. In the illustrated form, the first lock state selector 715 includes a pushbutton having a projected position and a depressed position. It is also contemplated that the lock state selector 715 may take another form, such as that of a push-turn button, a turnpiece, or a lock cylinder. Additionally, while the illustrated lock state selector 715 is mounted in the first handle 714, it should be appreciated that the lock state selector 715 may be mounted elsewhere.

The second handleset 720 is mounted to the second side 92 of the door 90, and generally includes a second spring cage 722, and a second handle 724 mounted to the second spring cage 722 for rotation about the longitudinal axis 701. While the illustrated second handle 724 is provided in the form of a lever, it should be appreciated that the second handle 724 may be provided in another form, such as that of a knob. In the illustrated form, the second handleset 720 further includes a second lock state selector 725 operable to adjust the locked/unlocked state of the lockset 700. It should be appreciated that the second lock state selector 725 may be provided in the same form as the first lock state selector 715, or may be provided in another form. For example, in certain embodiments, the second lock state selector 725 may be provided in the form of an override mechanism, such as a recessed turn-button or a pin-actuated kickoff.

In the illustrated form, each of the first handleset 710 and the second handleset 720 includes a corresponding and respective lock state selector 715, 725. In other embodiments, one of the handlesets 710, 720 may include a lock state selector while the other handleset 710, 720 does not include a lock state selector. Example forms of a lock state selector for an interior handleset include, for example, a pushbutton, a turn-button, a push-turn button, and a lock cylinder. Example forms of a lock state selector for an exterior handleset include, for example, an override mechanism, a recessed turn-button, a pin-actuated kickoff, and a lock cylinder.

Figure 16:
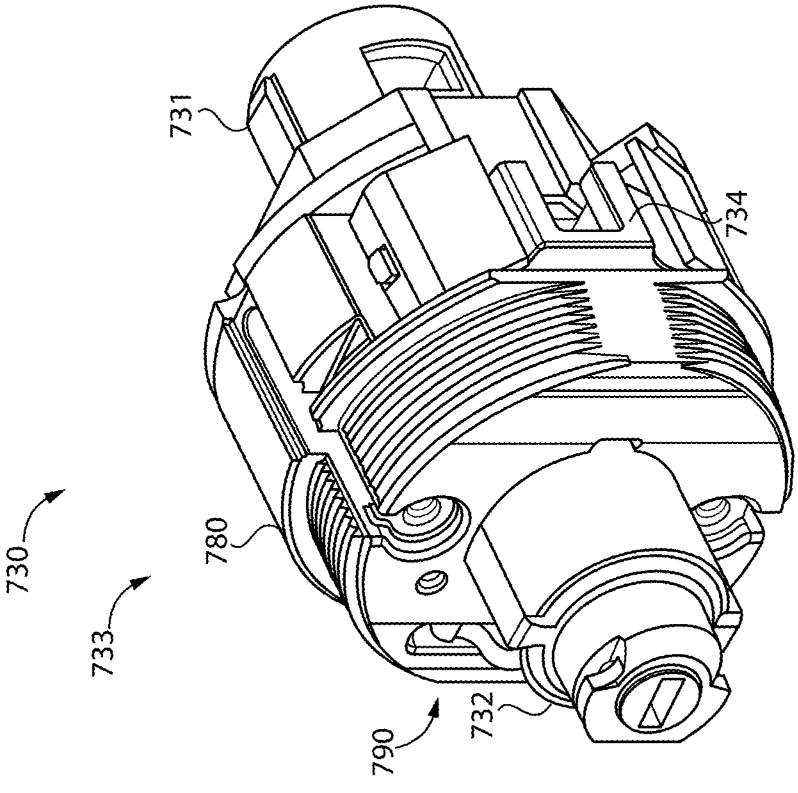
FIG. 16 is a perspective view of a chassis according to certain embodiments.

With additional reference to FIG. 16, the chassis 730 is mounted in the cross-bore 93, and generally includes a first chassis spindle 731, a second chassis spindle 732, a body portion 733 to which the spindles 731, 732 are mounted for independent rotation, a shuttle 734 mounted in the body portion 733 for sliding movement transverse to the longitudinal axis 701, a control lug 735 mounted in the body portion 733 for sliding longitudinal movement, and a cam assembly 736 operable to move the control lug 735 between a locking position and an unlocking position to thereby adjust the locked/unlocked state of the lockset 700. Each of the chassis spindles 731, 732 is engaged with the shuttle 734 such that the shuttle 734 retracts in response to rotation of each individual chassis spindle 731, 732. As described herein, the shuttle 734 is engaged with the latch mechanism 740 such that retraction of the shuttle 734 actuates the latch mechanism 740 and retracts the latchbolt 744.

One of the chassis spindles 731, 732 is an inside chassis spindle, and the other of the chassis spindles 731, 732 is an outside chassis spindle. The inside chassis spindle 731/732 is connected with the inside handle 714/724 such that the inside handle 714/724 is at least selectively operable to rotate the inside chassis spindle 731/732 to thereby retract the shuttle 734. The outside chassis spindle 731/732 is connected with the outside handle 714/724 such that the outside handle 714/724 is selectively operable to rotate the outside chassis spindle 731/732 to thereby retract the shuttle 734.

The control lug 735 has a locking/unlocking position corresponding to the locked/unlocked state of the lockset 700. Stated another way, the control lug 735 has a locking position corresponding to the locked state, and an unlocking position corresponding to the unlocked state. As described herein, the control lug 735 in the locking position prevents the outside handle 714/724 from retracting the shuttle 734 and actuating the latch mechanism 740, while the control lug 735 in the unlocking position permits the outside handle 714/724 to retract the shuttle 734 and actuate the latch mechanism 740.

The cam assembly 736 is engaged with the control lug 735 and is configured to move the control lug 735 between its locking position and its unlocking position. In certain embodiments, the cam assembly 736 is configured to move the control lug 735 from its unlocking position to its locking position in response to a locking actuation of an inside lock state selector. As one example, the cam assembly 736 may longitudinally drive the control lug 735 from its unlocking position to its locking position in response to depression of a pushbutton. In certain embodiments, the cam assembly 736 is configured to move the control lug 735 from its locking position to its unlocking position in response to an unlocking actuation of an outside lock state selector. As one example, the cam assembly 736 may longitudinally move the control lug 735 from its locking position to its unlocking position in response to actuation of a lock cylinder. Cam assemblies of this type are generally known in the art, and need not be described in further detail herein.

In certain embodiments, the chassis 730 may be configured to provide a "freewheel" locking state, in which the outside handle 714/724 is at all times free to rotate between its home position and its actuated position. In such forms, the control lug 735 in the locking position may decouple the outside handle 714/724 from the outside chassis spindle 731/732 to prevent actuation of the shuttle 734, and in the unlocking position may rotationally couple the outside handle 714/724 to the outside chassis spindle 731/732.

In certain embodiments, the chassis 730 may be configured to provide a "locked stationary" locking state, in which the outside handle 714/724 is free to rotate only when the lockset 700 is in the unlocked state. For example, the control lug 735 in the locking position may rotationally lock the outside handle 714/724 to the body portion 733, and in the unlocking position may rotationally decouple the outside handle 714/724 from the body portion 733 to permit rotation of the outside handle 714/724 for actuation of the latch mechanism 740.

Figure 17:
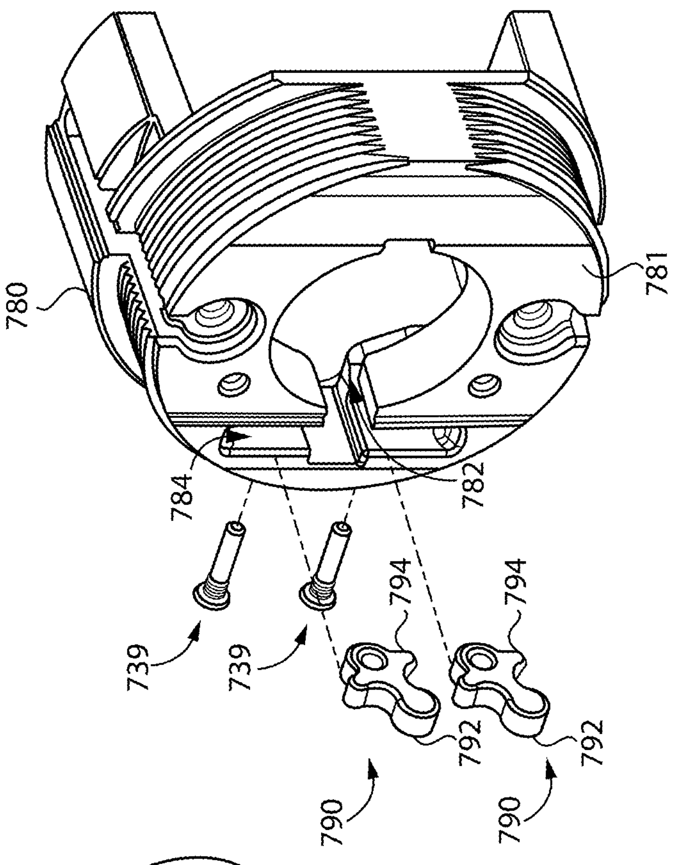
FIG. 17 is an exploded assembly view of a portion of the chassis illustrated in FIG. 16.

With additional reference to FIG. 17, the illustrated chassis body portion 733 includes a housing component 780 that pivotably supports at least one pivot crank 790. The housing component 780 includes a longitudinally-extending channel 782 and a vertically-oriented trough 784. As described herein, a moving component 738 of the chassis 730 moves within the channel 782, and the pivot cranks 790 are pivotably mounted in the trough 784.

The chassis 730 includes least one pivot crank 790 operable to actuate the indicator assembly 800 as the lockset 700 moves between its locked and unlocked states. In the illustrated form, the chassis 730 includes two pivot cranks 790, which may facilitate handing selection for the lockset 700 as described herein. Each pivot crank 790 is mounted to the chassis 730 for pivotal movement between a first pivot crank position and a second pivot crank position. For example, each pivot crank 790 may be pivotably mounted to the housing component 780 via a corresponding and respective pivot pin 739.

Each of the illustrated pivot cranks 790 generally includes a first lobe 792 and at least one second lobe 794. The first lobe 792 projects beyond an end face 781 of the housing component 780, and is operable to engage the indicator assembly 800 as described herein. The second lobe 794 is operable to project into the channel 782 such that a moving component 738 of the chassis 730 is operable to engage the second lobe 794 to thereby pivot the pivot crank 790 from its first position to its second position. In the illustrated form, a length of the first lobe 792 is greater than a length of the second lobe 794 such that a displacement multiplication is achieved. Stated another way, the pivot crank 790 is operable to convert a relatively small input displacement (e.g., from the moving component 738 to the second lobe 794) to a relatively larger output displacement (e.g., from the first lobe 792 to the indicator assembly 800) to thereby provide a mechanical advantage.

In the illustrated form, the chassis 730 includes a first pivot crank 790 and a second pivot crank 790. One of the pivot cranks 790 is an active pivot crank that is operable to be engaged by the moving component 738, and the other of the pivot cranks 790 is an idle pivot crank that is not operable to be engaged by the moving component 738. The provision of two pivot cranks 790 may facilitate the process of handing selection for the lockset 700. For example, the lockset 700 may have a first handing configuration in which the first pivot crank 790 is the active pivot crank and the second pivot crank 790 is the idle pivot crank. In order to transition the lockset 700 to a second handing orientation, the chassis 730 may be rotated 180° about the longitudinal axis 701 to an orientation in which the first pivot crank 790 is the idle pivot crank and the second pivot crank 790 is the active pivot crank.

As noted above, the active pivot crank 790 is operable to be engaged by a moving component 738 of the chassis 730 such that the pivot crank 790 pivots between a first pivot crank position and a second pivot crank position as the lockset 700 transitions between its locked state and its unlocked state. In certain embodiments, the moving component 738 that actuates the active pivot crank 790 is the control lug 735, for example as described with reference to FIGS. 29 and 30. In certain embodiments, the moving component 738 that actuates the active pivot crank 790 is a lug simulator 1018, for example as described with reference to FIGS. 31-34.

Figure 19:
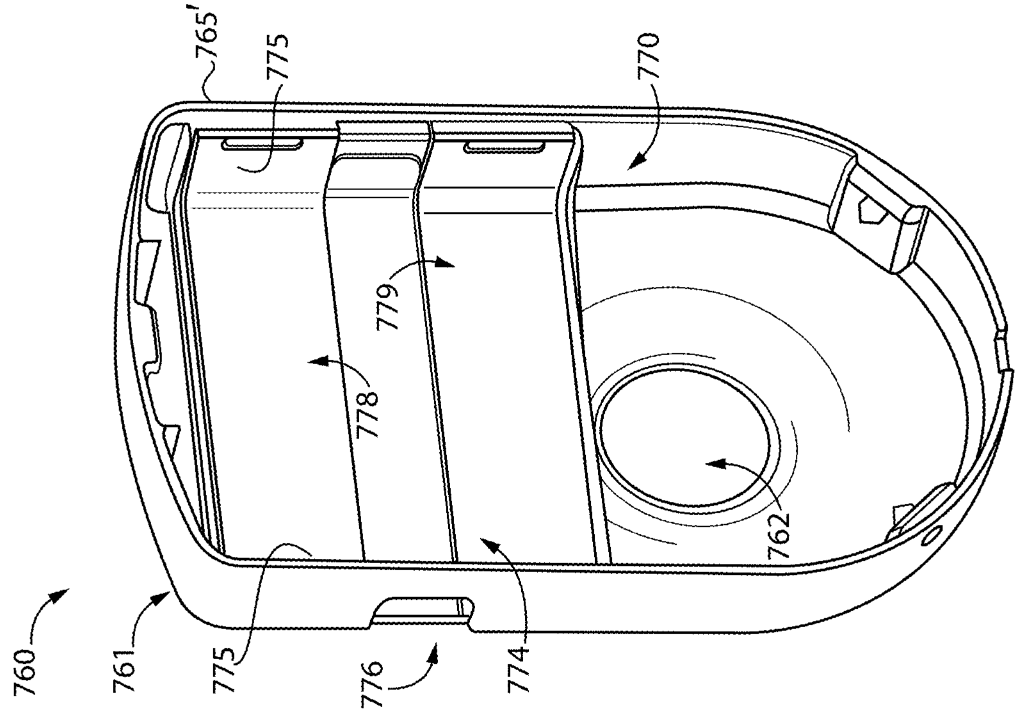
FIG. 19 is a rear perspective view of the escutcheon illustrated in FIG. 18.
Figure 18:
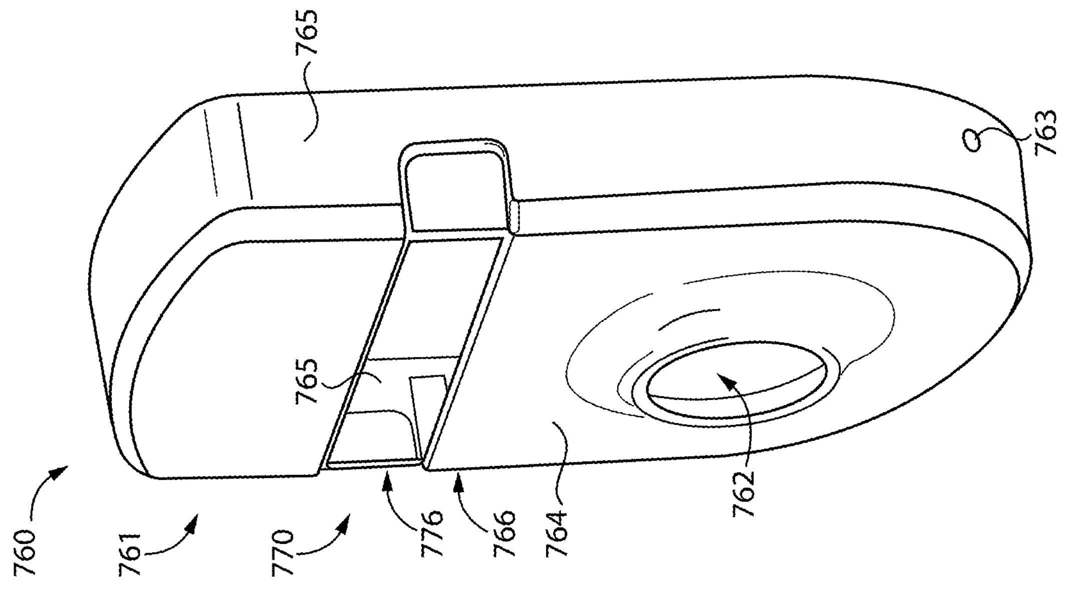
FIG. 18 is a perspective view of an escutcheon according to certain embodiments.

With additional reference to FIGS. 18 and 19, the escutcheon 760 generally includes a housing 761 and a transparent or translucent shield 770. The housing 761 includes a spindle aperture 762 through which the drive spindle 713 extends, a front wall 764, sidewalls 765, and a window 766 through which a portion of the indicator plate 860 is visible. In the illustrated form, the window 766 extends across the front wall 764 and into each of the sidewalls 765. In certain embodiments, these features may facilitate the viewing of the locked/unlocked status indication across a greater viewing angle, such as a viewing angle of at least 180°. However, it should be appreciated that the window 766 may take another form, such as one that is confined to the front wall 764. In certain forms, the housing 761 may include a fastener aperture 763 operable to receive a fastener (e.g., a set screw) by which the housing 761 may be secured to the spring cage housing 712 to prevent rotation of the escutcheon 760 relative to the door 90. In certain embodiments, the housing 761 may be formed of a metal material.

The shield 770 is positioned at least partially within the housing 761, and generally includes a front panel 774, a pair of side panels 775 that project rearward from the front panel 774, and a viewing area 776 that is aligned with the window 766. In certain embodiments, the viewing area 776 may be raised relative to the remainder of the front panel 774 such that material of the shield 770 projects into the window 766. In certain embodiments, the shield 770 may be formed of a transparent or translucent material. For example, the shield 770 may be formed of clear polycarbonate. In certain forms, the housing 760 may include one or more lips 765', which may abut the rear edges of the side panels 775 to restrict longitudinal movement of the shield 770 relative to the housing 761.

While other forms are contemplated, in the illustrated embodiment, the shield 770 is significantly larger than the window 766, and includes an upper portion 778 above the window 766 and a lower portion 779 below the window 766. In certain embodiments, each of the upper portion 778 and the lower portion 779 may have a corresponding and respective height in the range of 0.5 inch to 1.5 inch. The enlarged size of the shield 770 compared to the window 766 may serve one or more functions that may be desirable in certain embodiments. For example, the greater amount of material may improve part stiffness to resist deflection. In certain forms, the side panels 775 may abut a baseplate 810 of the indicator assembly 800 to further resist deflection, for example in the event that a user presses on the front face of the viewing area 776. Sidewall support (e.g., from tabs 816 of the baseplate 810) may additionally or alternatively resist squeezing of the viewing area 776 from the sides. Additionally or alternatively, the shield 770 may prevent the indicator sign 860 from rubbing against the rear side of the housing 761 as the sign 860 moves throughout its standard movement range. This may provide a consistent and smooth bearing surface that surrounds the indicator sign 860 and facilitates the movement thereof.

Figure 20:
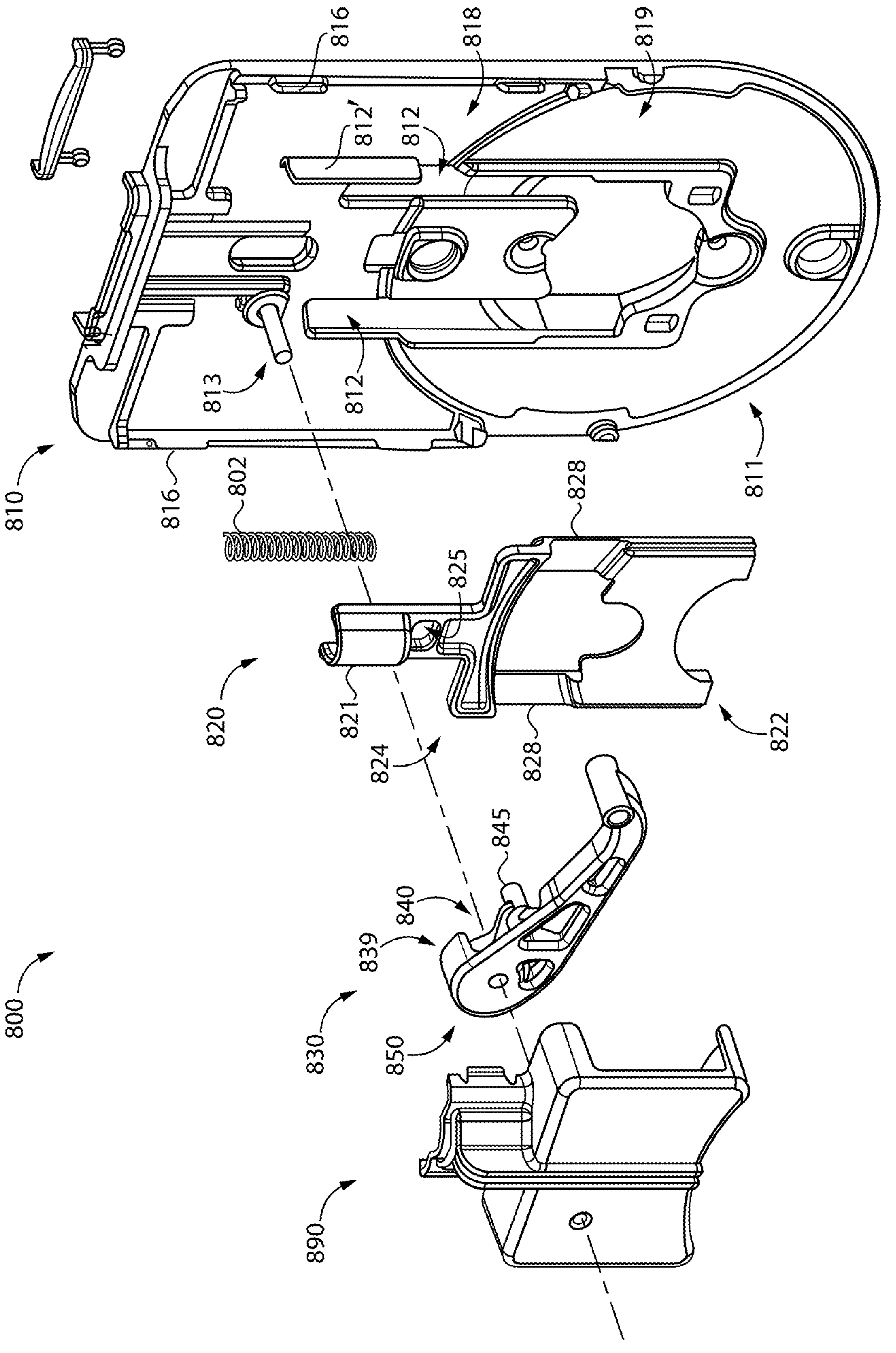
FIG. 20 is an exploded assembly view of an indicator assembly according to certain embodiments.

With additional reference to FIG. 20, the illustrated indicator assembly 800 generally includes a baseplate 810, a slider 820 slidably mounted to the baseplate 810, a transmission 830 pivotably mounted to the baseplate 810, an indicator sign 860 (FIG. 15) slidably mounted in the escutcheon 760, and a cover 890 partially enclosing the slider 820 and the transmission 830. As described herein, the slider 820 is operable to move from a first slider position to a second slider position in response to an actuating input (e.g., from the chassis 730), and the transmission 830 is operable to drive the indicator sign 860 between a first indicator sign position and a second indicator sign position in response to movement of the slider 820 between the first slider position and the second slider position.

The baseplate 810 is operable to be mounted to the door 90 and/or the chassis 730, and provides a base to which one or more other components of the indicator assembly 800 may be mounted. In the illustrated form, the baseplate 810 includes a mounting area 811 for the spring cage 711, which defines a boundary between an exterior first region 818 and an interior second region 819. The baseplate 810 may include one or more vertically-oriented tracks 812 and/or one or more guide walls 812' that may aid in constraining the slider 820 to movement along a straight path between the first slider position and the second slider position. The baseplate 810 may include a mounting post 813 to which the transmission 830 may be mounted for pivotal movement in response to sliding movement of the slider 830.

The slider 820 is mounted to the baseplate 810 for sliding movement between a first slider position and a second slider position, and may be biased to the first slider position by a bias member 802. While the illustrated bias member 802 is provided in the form of a compression spring, it should be appreciated that the bias member 802 may be provided in another form, such as one including an extension spring, a torsion spring, a leaf spring, an elastic member, and/or magnets. In the illustrated form, the bias member 802 is captured between the baseplate 810 and the slider 820 to thereby bias the slider 820 downward toward the first slider position. In certain embodiments, the slider 820 may include a shield 821 to at least partially cover the bias member 802.

The slider 820 includes a lower portion 822, an upper portion 824, and a pair of legs 828 extending between and connecting the lower portion 822 and the upper portion 824. The lower portion 822 is seated in the interior region 819 and within the footprint of the spring cage 711, and receives the actuating input from the chassis 730 as described herein. The upper portion 824 is positioned in the exterior region 818 outside of the spring cage 711, and is pivotably connected with a portion of the transmission 830. For example, the upper portion 824 may include an opening 825 that receives a finger 845 of the transmission 830 such that the finger 845 moves with the slider 820. The legs 828 are recessed relative to the lower portion 822 and the upper portion 824, which may permit the legs 828 to be positioned behind the lip of the spring cage housing 712 such that the slider 820 is operable to slide between its first and second positions without interference from the spring cage 711.

Figure 21:
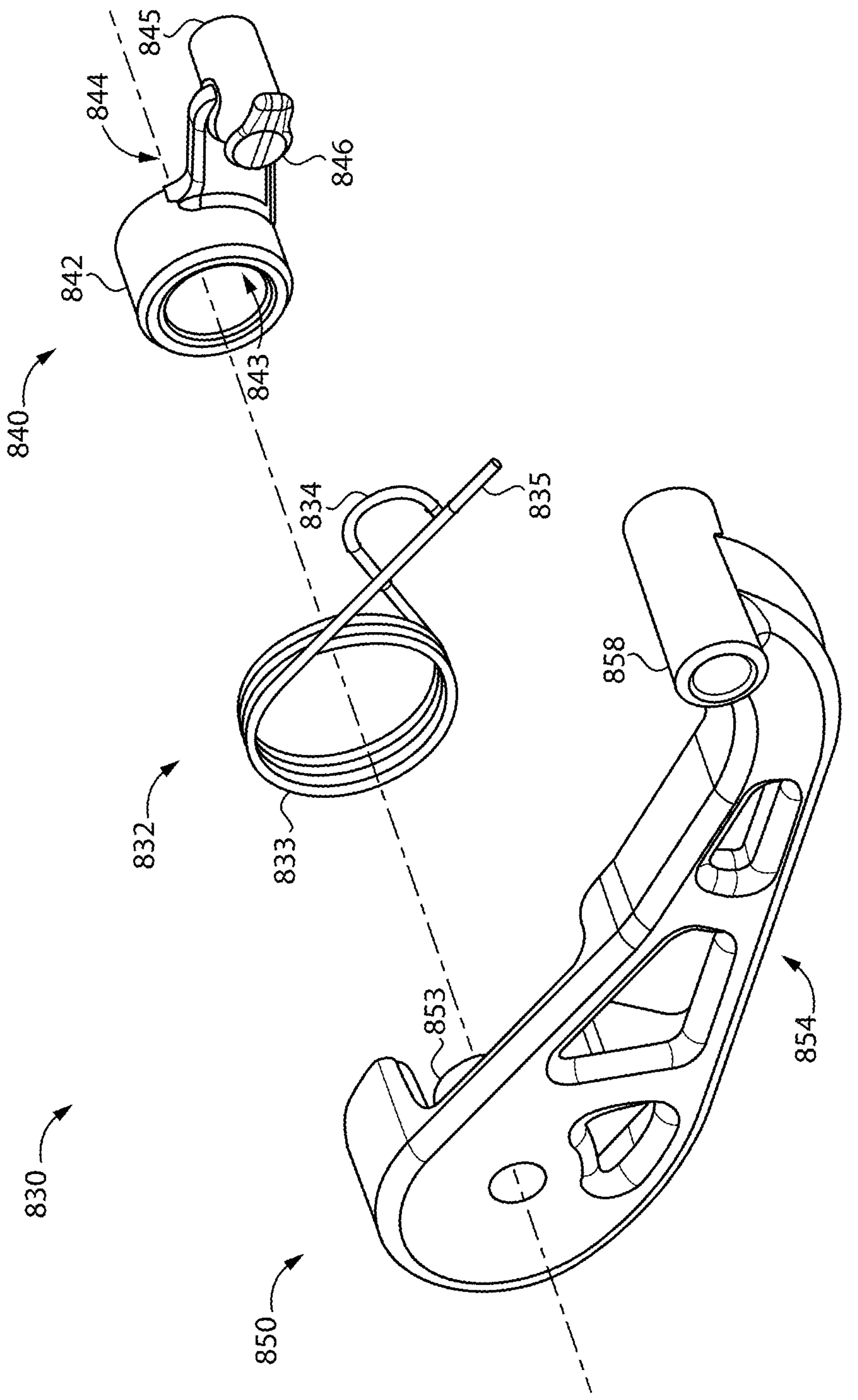
FIG. 21 is an exploded view of a transmission according to certain embodiments.

With additional reference to FIG. 21, the illustrated transmission 830 generally includes an actuating lever 840, an indicator lever 850, and an anti-jam spring 832 engaged between the actuating lever 840 and the indicator lever 850. The actuating lever 840 and the indicator lever 850 are engaged with one another through a lost rotational motion connection 839 such that, in the absence of the anti-jam spring 832, the actuating lever 840 and the indicator lever 850 are free to rotate relative to one another through a predetermined angular range.

The anti-jam spring 832 generally includes a coiled body portion 833, a first leg 834 anchored to the actuating lever 840, and a second leg 835 anchored to the indicator lever 850. It is also contemplated that the anti-jam spring 852 may be provided in another form, such as one including a compression spring, an extension spring, a leaf spring, an elastic member, or another form of biasing member. As described herein, the anti-jam spring 832 is configured to cause rotation of the indicator lever 850 in response to rotation of the actuating lever 840 when the indicator lever 850 is free to move between its first and second positions, and is configured to permit the actuating lever 840 to rotate relative to the indicator lever 850 when movement of the indicator lever 850 is blocked.

The actuating lever 840 is pivotably mounted to the post 813, and generally includes a cylindrical body portion 842 having a cavity 843 defined therein, and an arm 844 that projects radially from the body portion 842. The body portion 842 provides a mounting location for the anti-jam spring 832, the body portion 833 of which may be seated on and supported by the body portion 842 of the actuating lever 840. The arm 844 includes a finger 845 and an anchor post 846, which project from the arm 844 in opposite longitudinal directions. The finger 845 projects into the opening 825 of the slider 820 such that the actuating lever 840 pivots between a first actuating lever position and a second actuating lever position in response to sliding movement of the slider 820 between the first slider position and the second slider position. The anchor post 846 is engaged with the first leg 834 of the anti-jam spring 831 such that the first leg 834 travels with the actuating lever 840.

The indicator lever 850 is pivotably mounted to the post 813, and generally includes a boss 853 that projects into the cavity 843 such that the boss 853 pivotably supports the actuating lever 840. The indicator lever 850 also includes an arm 854, which may include a bearing post 858 through which the indicator lever 850 may be engaged with the indicator sign 860. The indicator lever 850 is coupled with the second leg 835 of the anti-jam spring 831 such that the second leg 835 travels with the indicator lever 840.

During operation of the transmission 830, rotation of the actuating lever 840 between a first actuating lever position and a second actuating lever position (e.g., in response to movement of the slider 820 between a first slider position and a second slider position as described herein) causes the anti-jam spring 832 to exert a corresponding rotational biasing force on the indicator arm 850. When the indicator arm 850 is not blocked from rotating in the appropriate direction, this biasing force causes the indicator arm 850 to rotate between a first indicator arm position and a second indicator arm position. However, when the indicator arm 850 is blocked from rotation (e.g., by the indicator sign 860 being jammed), the lost motion connection 839 permits relative rotation of the actuating lever 840 and the indicator lever 850. The anti-jam spring 832 deforms in response to rotation of the actuating lever 840, thereby storing mechanical energy and permitting the actuating lever 840 to rotate when the indicator arm 850 is blocked from movement. Should the blocking force be removed while the spring 832 is deformed, the spring 832 will release the stored mechanical energy and drive the indicator arm 850 to the indicator arm position corresponding to the current position of the actuating lever 840.

In the illustrated form, the transmission 830 is a multi-piece mechanism in which a lost motion connection 839 and an anti-jam spring 832 permit movement of the actuating arm 840 (and thus of the slider 820) even when the indicator arm 850 and/or the sign 860 is jammed. It should be appreciated, however, that in other embodiments, the transmission 830 may be formed of one or more components that directly correlate movement of the sign 860 with movement of the slider 820.

Figure 22:
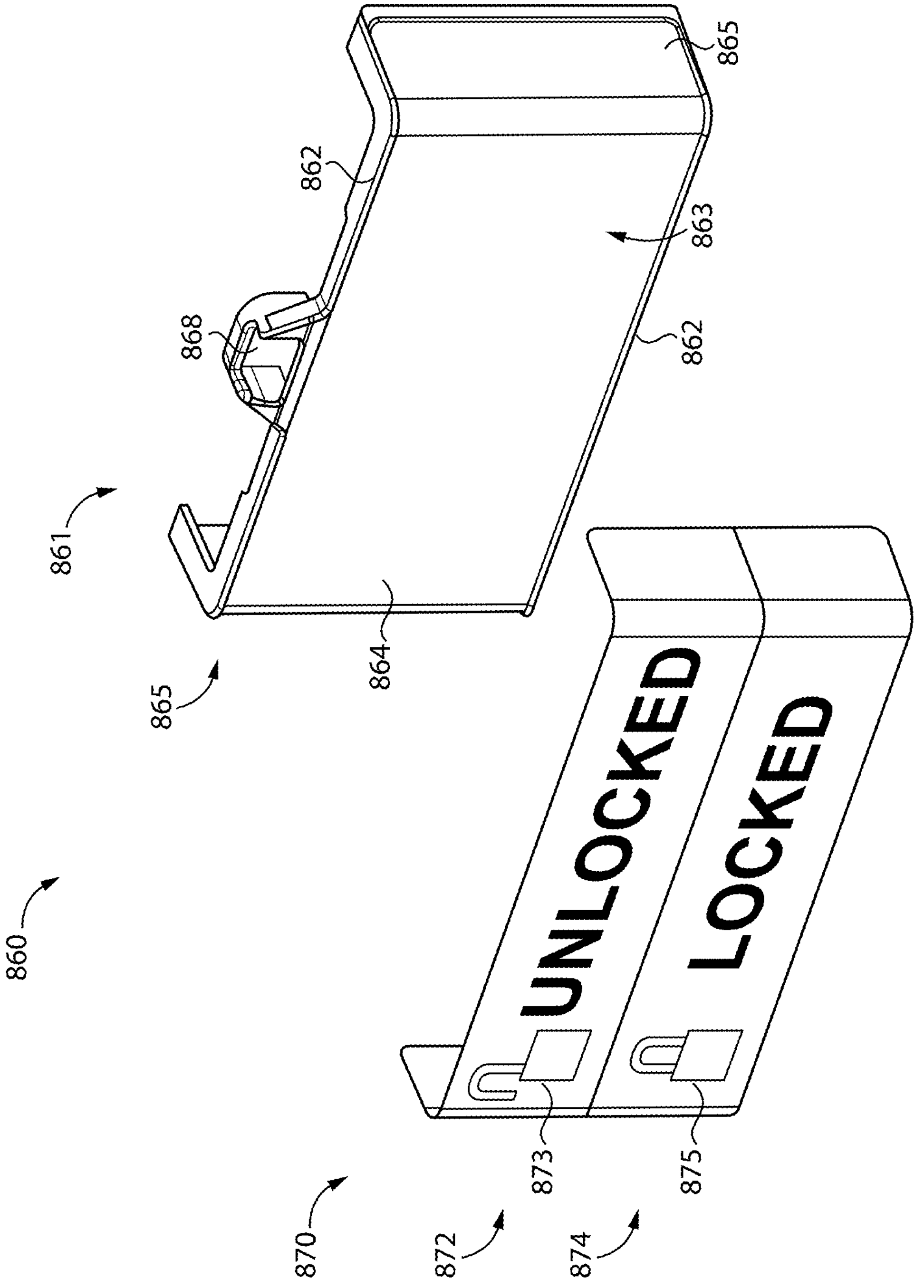
FIG. 22 is an exploded view of an indicator sign according to certain embodiments.

With additional reference to FIG. 22, illustrated therein is an example form of indicator sign 860. The illustrated sign 860 generally includes a frame 861 and a label 870. The frame 861 includes a front wall 864, a pair of sidewalls 865 extending rearward from the front wall 864, and an opening 868 configured to receive the bearing post 858 of the indicator arm 850. The label 870 generally includes a first indicating region 872 including first indicia 873 relating to a first state of the lockset 700 (e.g., the unlocked state), and a second indicating region 874 including second indicia 875 relating to a second state of the lockset 700 (e.g., the locked state). The label 870 is sized and shaped to extend across the front wall 864 and onto the sidewalls 865 such that each sidewall 865 includes a corresponding and respective portion of each indicating region 872, 874.

In certain embodiments, the frame 861 may include one or more lips 862 that define a slightly recessed area 863 in which the label 870 is seated. Such lip(s) 862 may provide a protective standoff for the label 870 to thereby discourage the label 870 from rubbing against the rear side of the shield 770 as the sign 860 moves between its first and second positions.

The indicator sign 860 is mounted in the escutcheon 760 for movement between a first indicator sign position and a second indicator sign position. While other forms are contemplated, in the illustrated form, the indicator sign 860 is mounted for vertical movement between the first indicator sign position and the second indicator sign position. When the indicator sign 860 is in the first indicator sign position, the first indicating region 872 is aligned with the escutcheon window 766 such that the first indicia 873 are visible through the viewing area 776. When the indicator sign 860 is in the second indicator sign position, the second indicating region 874 is aligned with the escutcheon window 766 such that the second indicia 875 are visible through the viewing area 776. As described herein, the indicator assembly 800 is configured to move the indicator sign 860 between its first and second positions in response to an actuating movement imparted by the chassis 730.

As noted above, the illustrated indicator sign 860 is provided as a multi-piece construction, in which a label 870 is adhered to a frame 861 to thereby at least partially define the indicator sign 860. This arrangement may provide one or more advantages. As one example, the multi-piece construction may enable the frame 861 to be formed separately from the indicia-bearing component (e.g., the label 870), thereby allowing virtually any desired geometry to be molded into the frame 861 without concern about introducing cosmetic defects into the indicator sign graphics. In certain embodiments, the frame 861 may be formed of a resin having properties that are preferred for a functional part.

In the illustrated form, each indicating region 872, 874 includes plural indicia, each relating to the corresponding state of the lockset 700. For example, the first indicating region 872 includes one or more first indicia 873, which in the illustrated form include a first symbol (an unlocked padlock), a first word ("UNLOCKED") and a first background color (white). Each of these first indicia 873 may serve to indicate to the user that the lockset 700 is unlocked when the first indicating region 872 is aligned with the window 766. Similarly, the second indicating region 874 includes one or more second indicia 875, which in the illustrated form include a second symbol (a locked padlock), a second word ("LOCKED"), and a second background color (red). Each of the second indicia 875 may serve to indicate to the user that the lockset 700 is locked when the second indicating region 874 is aligned with the window 766. It should be appreciated, however, that additional or alternative forms of indicia may be used in connection with the first indicating region 872 and/or the second indicating region 874.

As described herein, in the illustrated embodiment, a mechanical indicator sign 860 is slidably mounted in the escutcheon 760 to selectively display one or more indicia relating to one or more states of the lockset 700, and is actuated by the transmission 830. It is also contemplated that the transmission 830 may be utilized to actuate other form of indicators, such as electronic ink displays, light emitting diode (LED) displays, liquid crystal displays (LCDs), lights, buzzers, speakers, or another form of visual and/or audible indicator.

Figure 24:
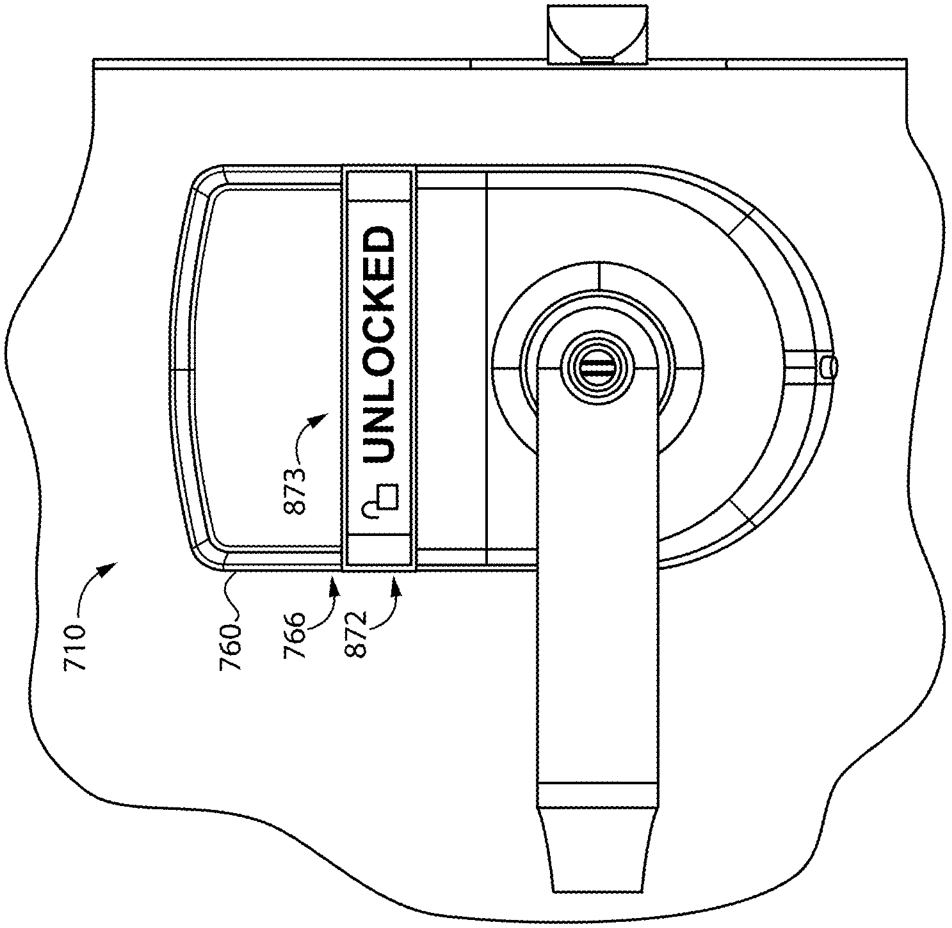
FIG. 24 is a front view of a handleset with the indicator assembly illustrated in FIG. 23 in the first state.
Figure 23:
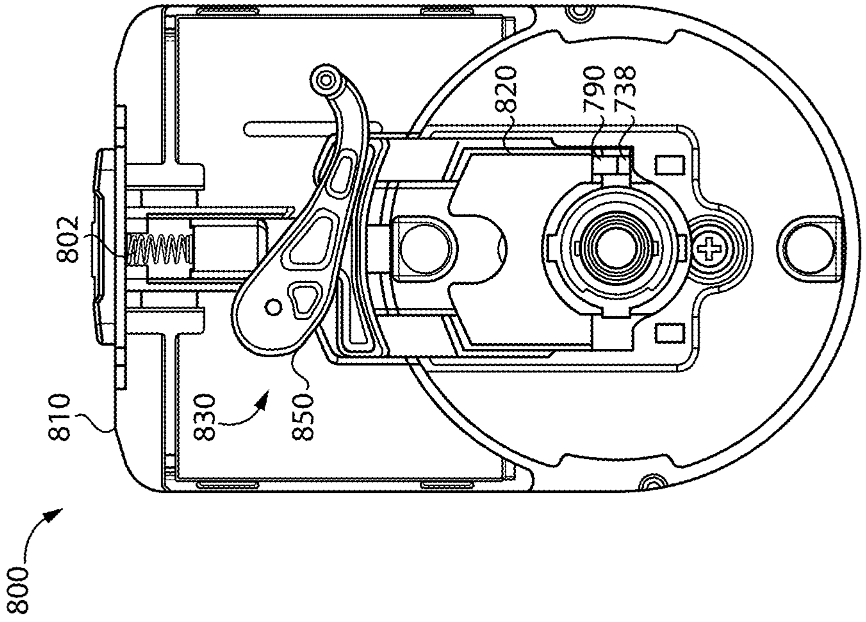
FIG. 23 is a front view of an indicator assembly in a first state.

With additional reference to FIGS. 23 and 24, illustrated therein are certain portions of the indicator assembly 800 with the lockset 700 in an unlocked state. In this first state, the moving component 738 (e.g., the control lug 735 or a lug simulator) is in its first or unlocking position, in which the moving component 738 permits the active pivot crank 790 to adopt the first pivot crank position. Additionally, the bias element 802 urges the slider 820 downward, thereby causing the slider 820 to engage the first lobe 792 of the active pivot crank 790, thereby urging the active pivot crank 790 toward its first position. With the slider 820 in the first slider position, the actuating lever 840 and the indicator lever 850 each adopt their respective first positions, thereby placing the indicator sign 860 in its first position. With the indicator sign 860 in its first position, the first indicating region 872 is aligned with the window 766 such that the first indicia 873 are displayed to provide the user with a visual indication regarding the unlocked state of the lockset 700.

Figure 26:
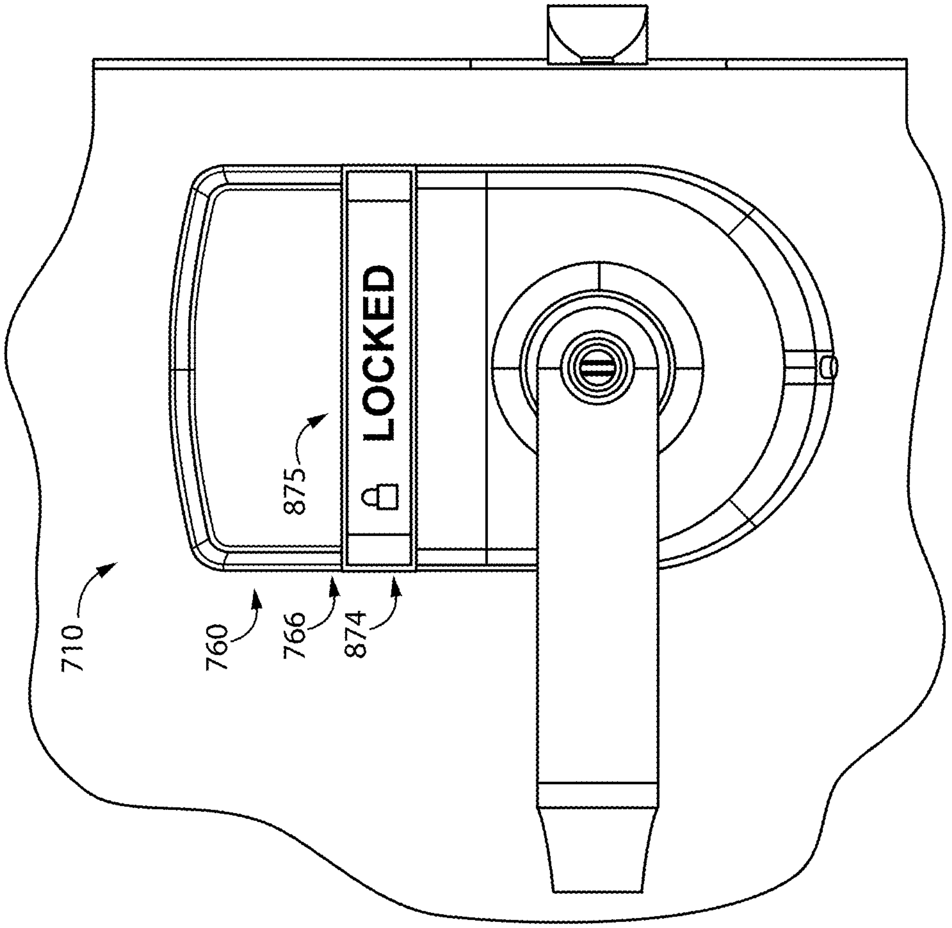
FIG. 26 is a front view of the handleset illustrated in FIG. 24 with the indicator assembly illustrated in FIG. 23 in the second state.
Figure 25:
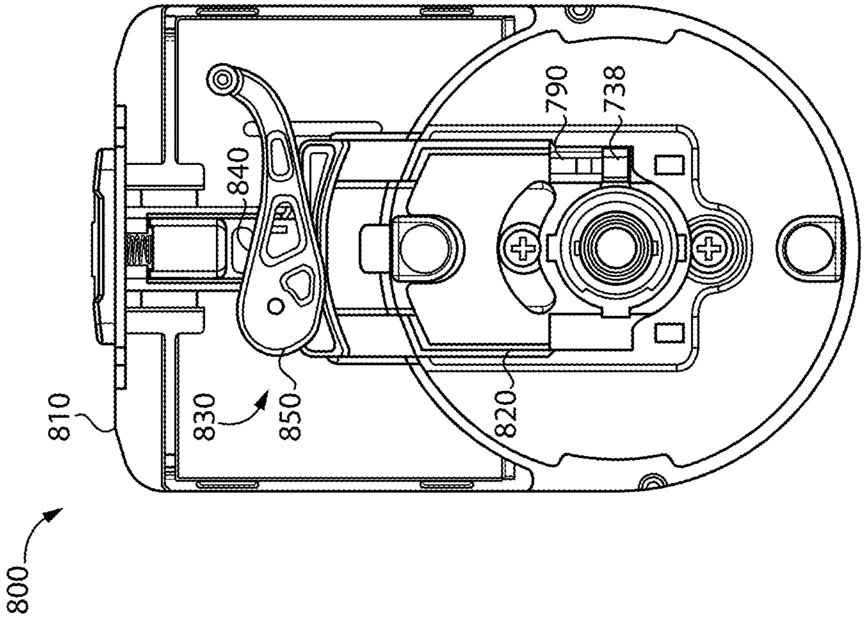
FIG. 25 is a front view of the indicator assembly illustrated in FIG. 23 in a second state.

With additional reference to FIGS. 25 and 26, illustrated therein are certain portions of the indicator assembly 800 with the lockset 700 in a locked state. In this second state, the moving component 738 (e.g., the control lug 735 or a lug simulator) is in its second locking position, in which the moving component 738 retains the active pivot crank 790 in the second pivot crank position. As the active pivot crank 790 moves to its second position, the first lobe 792 drives the slider 820 upward against the force of the bias element 802, thereby moving the slider 820 to the second slider position. Such movement of the slider 820 causes the transmission 830 to drive the indicator sign 860 to its second position. More particularly, the actuating lever 840 is pivoted to the actuating lever second position by movement of the slider 820 to the second slider position, and such pivoting of the actuating lever 840 causes the anti-jam spring 832 to urge the indicator lever 850 to the second indicator lever position to thereby place the indicator sign 860 in its second position. With the indicator sign 860 in its second position, the second indicating region 874 is aligned with the window 766 such that the second indicia 875 are displayed to provide the user with a visual indication regarding the locked state of the lockset 700.

In the illustrated configuration, the movable components of the indicator assembly 800 occupy their corresponding and respective first positions when the lockset 700 is in the unlocked state, and occupy their corresponding and respective second positions when the lockset 700 is in the locked state. It is also contemplated that this arrangement may be reversed such that the first positions correspond to the locked state and the second positions correspond to the unlocked state. Additionally, various movable components of the indicator assembly 800 are operable to move between a first position and a second position. In certain forms, a movable component may be considered capable of performing a first movement and a second movement to move between the first and second positions. For example, a component may perform or undergo a first movement in a first direction while moving from the first position to the second position, and may perform or undergo a second movement in a second direction opposite the first direction when moving from the second position to the first position.

Figure 27:
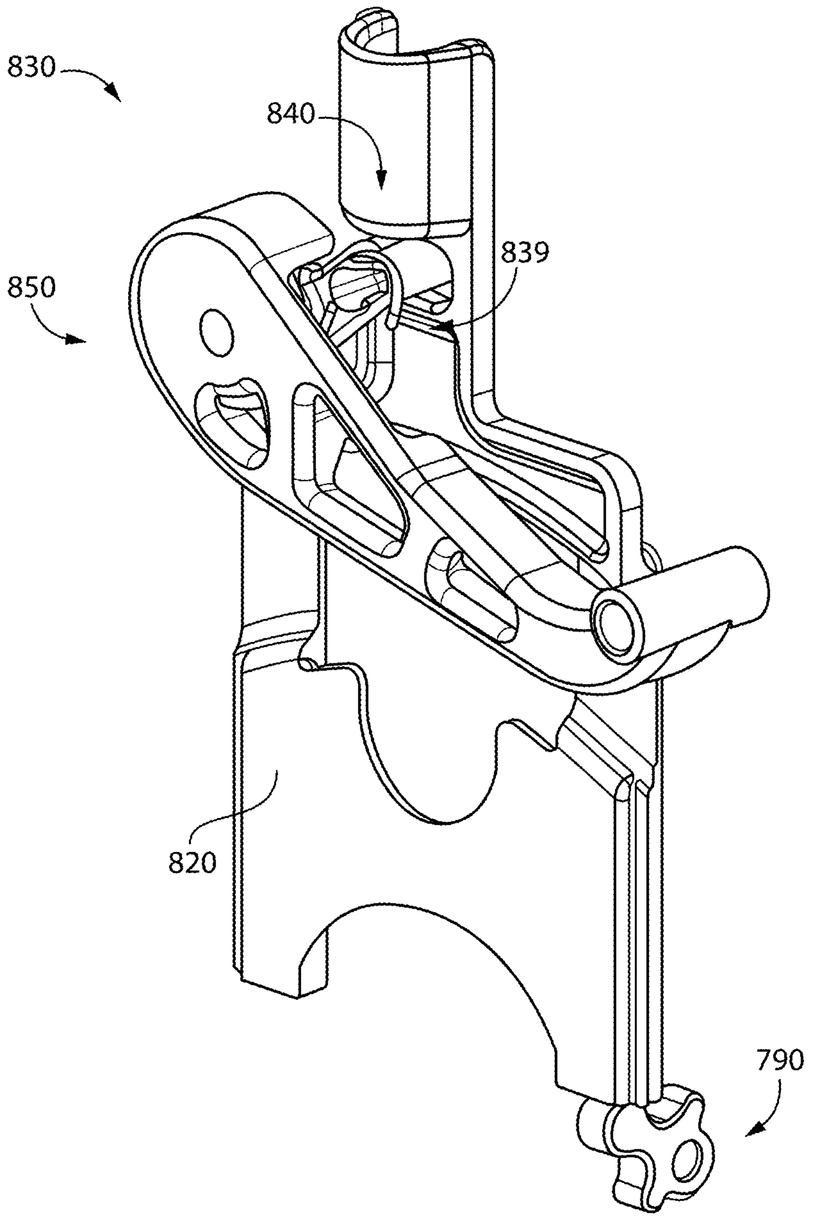
FIG. 27 illustrates a portion of the indicator assembly illustrated in FIG. 23 while an indicator lever is blocked from moving from a first position to a second position.

With additional reference to FIG. 27, as noted above, the illustrated transmission 830 is configured to permit movement of the slider 820 and the active pivot crank 790 even when movement of the indicator sign 860 is blocked. In the state illustrated in FIG. 27, the indicator lever 850 is prevented from moving to its second position, for example by the indicator sign 860 being jammed. With the indicator lever 850 blocked, the pivot crank 790 has nonetheless driven the slider 820 upward to its second position, thereby driving the actuating lever 840 to its second position while storing mechanical energy in the anti-jam spring 832. Those skilled in the art will readily appreciate that the lost rotational motion connection 839 may facilitate such pivoting of the actuating lever 840 relative to the indicator lever 850. Once the blocking obstruction is removed, the anti-jam spring 832 may release its stored energy to drive the indicator lever 850 to the second indicator lever position.

Figure 28:
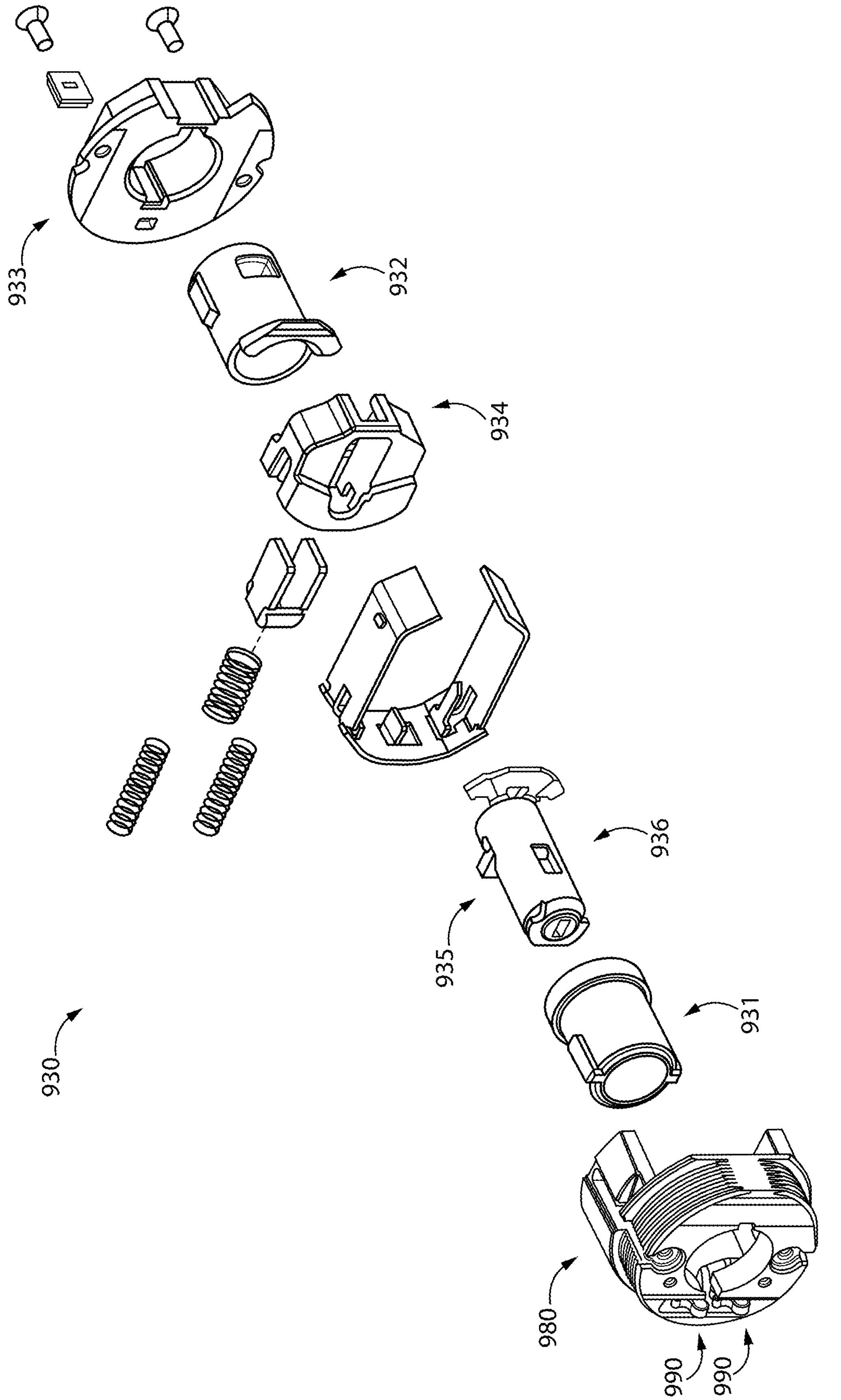
FIG. 28 is an exploded view of a lockset chassis according to certain embodiments.

With additional reference to FIG. 28, illustrated therein is a chassis 930 that may be utilized as the chassis 730 in certain embodiments. The chassis 930 generally includes a first chassis spindle 931, a second chassis spindle 932, a body portion 933, a shuttle 934, a control lug 935, a cam assembly 936, a housing component 980, and a pair of pivot cranks 990, which respectively correspond to the first chassis spindle 731, second chassis spindle 732, body portion 733, shuttle 734, control lug 735, cam assembly 736, housing component 780, and pivot cranks 790 of the above-described chassis 730. While other forms are contemplated, in the illustrated embodiment, the first chassis spindle 931 is an outside chassis spindle configured for engagement with an exterior handle, the second chassis spindle 932 is an inside chassis spindle configured for engagement with an interior handle, and the housing component 980 (including the pivot cranks 990) is positioned on the exterior side of the chassis 930.

Figure 30:
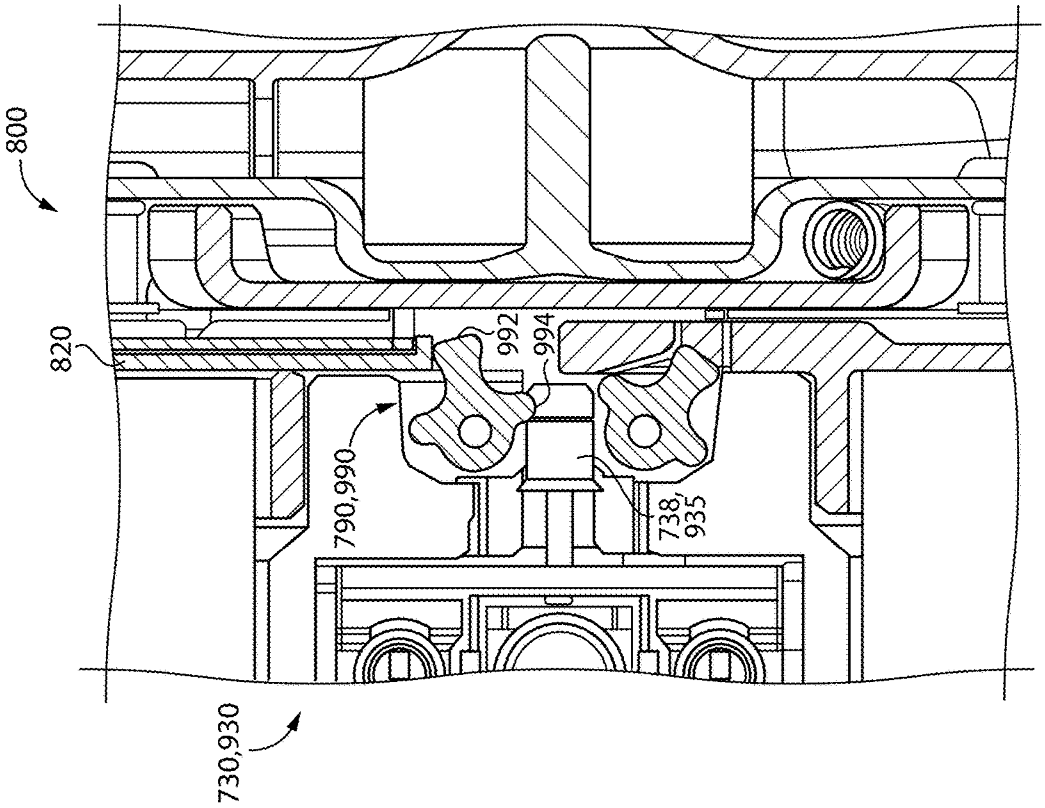
FIG. 30 is a cross-sectional view of the portion of the lockset illustrated in FIG. 29 in a second lockset state, in which the lockset places the indicator assembly in a second indicator assembly state.
Figure 29:
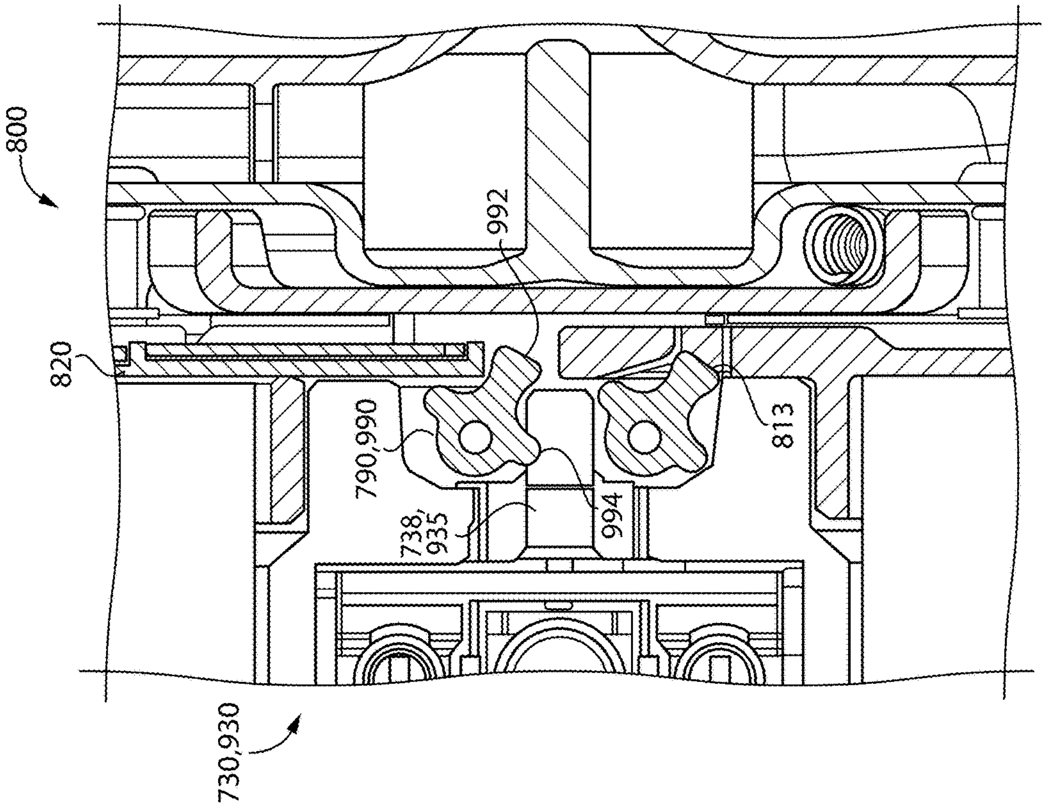
FIG. 29 is a cross-sectional view of a portion of a lockset in a first lockset state, in which the lockset places an indicator assembly in a first indicator assembly state.

With additional reference to FIGS. 29 and 30, the chassis 930 may be utilized as the chassis 730, for example in embodiments in which the consumer wishes for the lockset 700 to include an indicator assembly 800 on the exterior side of the lockset 700. In such forms, the control lug 935 serves as the moving component 738 that engages the active pivot crank 790, 990. With the moving control lug 738, 935 in a first (e.g., unlocking) position (FIG. 29), the moving control lug 738, 935 is disengaged from the active pivot crank 790, 990 such that the active pivot crank 790, 990 adopts the first pivot crank position, thereby causing the indicator assembly 800 to adopt the first state illustrated in FIGS. 23 and 24. As the moving control lug 738, 935 moves to a second (e.g., locking) position (FIG. 30), the control lug 738, 935 engages the second lobe 994 and pivots the active pivot crank 790, 990, thereby causing the active pivot crank 790, 990 to drive the slider 820 upward to its second position. As a result, the indicator assembly 800 is driven to the second state illustrated in FIGS. 25 and 26. In certain embodiments, the baseplate 810 may include a recess 813 that receives at least a portion of the idle pivot crank 790, 990 to ensure that the idle pivot crank 790, 990 does not interfere with operation of the indicator assembly 800 or other components of the lockset 700.

Figure 31:
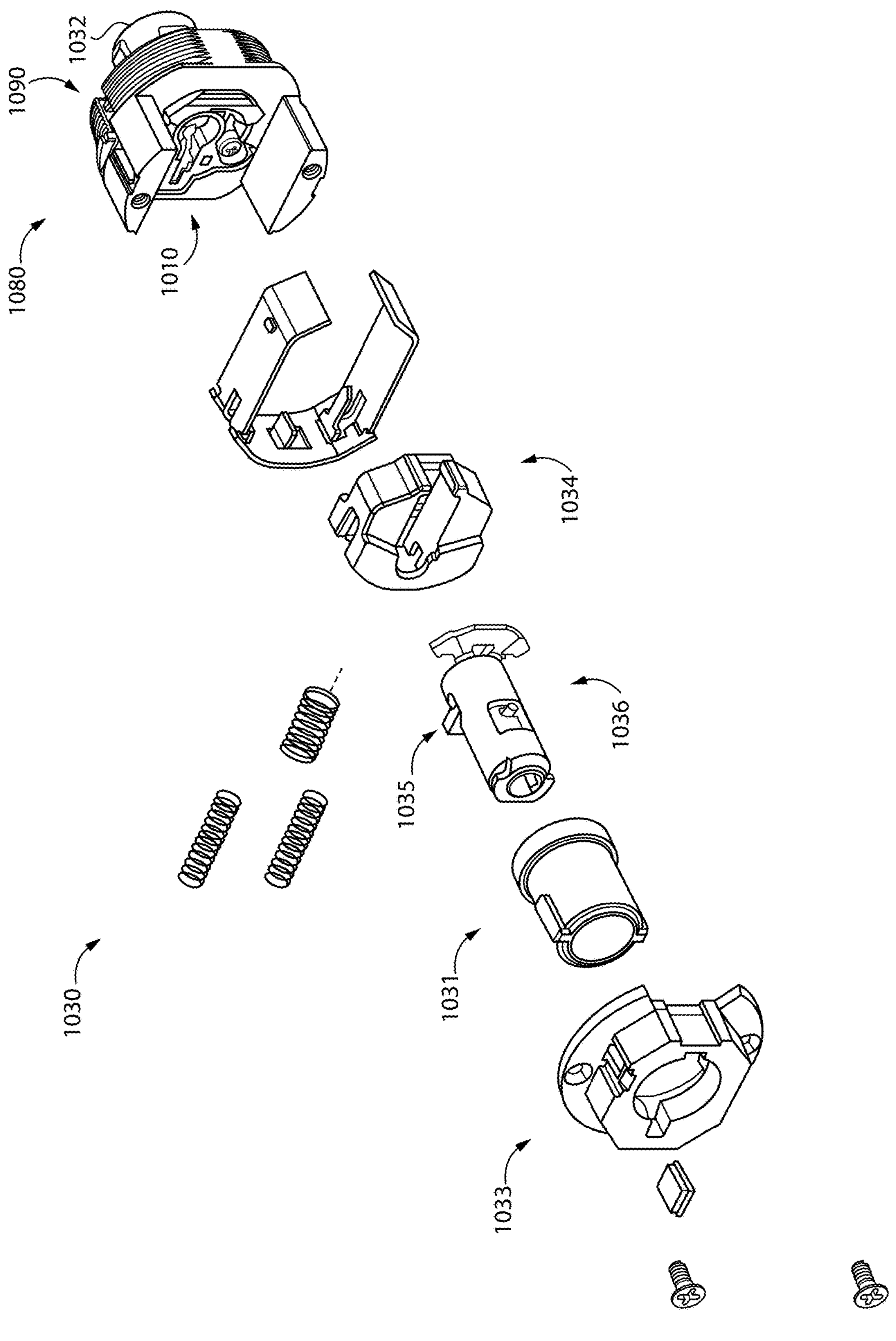
FIG. 31 is an exploded assembly view of a lockset chassis according to certain embodiments.

With additional reference to FIG. 31, illustrated therein is a chassis 1030 that may be utilized as the chassis 730 in certain embodiments. The chassis 1030 generally includes a first chassis spindle 1031, a second chassis spindle 1032, a body portion 1033, a shuttle 1034, a control lug 1035, a cam assembly 1036, a housing component 1080, and a pair of pivot cranks 1090, which respectively correspond to the first chassis spindle 731, second chassis spindle 732, body portion 733, shuttle 734, control lug 735, cam assembly 736, housing component 780, and pivot cranks 790 of the above-described chassis 730. As described herein, the chassis 1030 further includes a reversing mechanism 1010 or movement reverser, which may be mounted to the housing component 1080 in the vicinity of the pivot cranks 1090. While other forms are contemplated, in the illustrated embodiment, the first chassis spindle 1031 is an outside chassis spindle configured for engagement with an exterior handle, the second chassis spindle 1032 is an inside chassis spindle configured for engagement with an interior handle, and the housing component 1080 (including the pivot cranks 1090) is positioned on the interior side of the chassis 1030. As described herein, the chassis 1030 may be utilized as the chassis 730 in embodiments in which the consumer wishes to provide the indicator assembly 800 on the interior side of the lockset 700.

Figure 32:
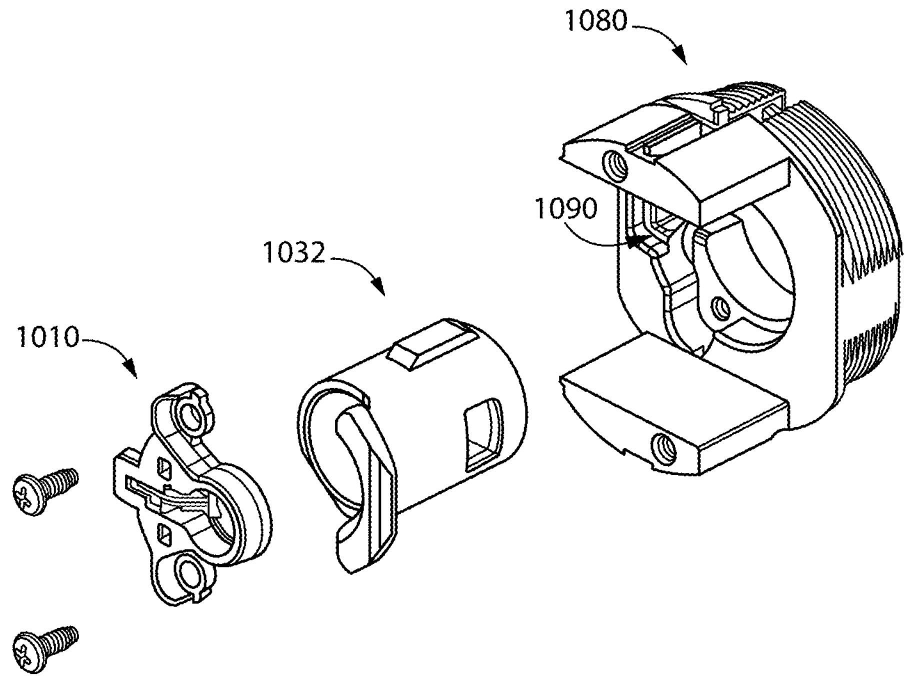
FIG. 32 is a partially-exploded assembly view of a portion of the lockset chassis illustrated in FIG. 31.

With additional reference to FIG. 32, the reversing mechanism 1010 is mounted to the housing component 1080, and is operable to actuate the active pivot crank 1090 in response to an actuating input provided by a user (e.g., by actuating an interior lock state selector). As described herein, the reversing mechanism 1010 is configured to reverse the direction of the actuating input to thereby drive a moving component 738 in the form of a lug simulator 1018 in a direction opposite that of the actuating input.

Figure 33:
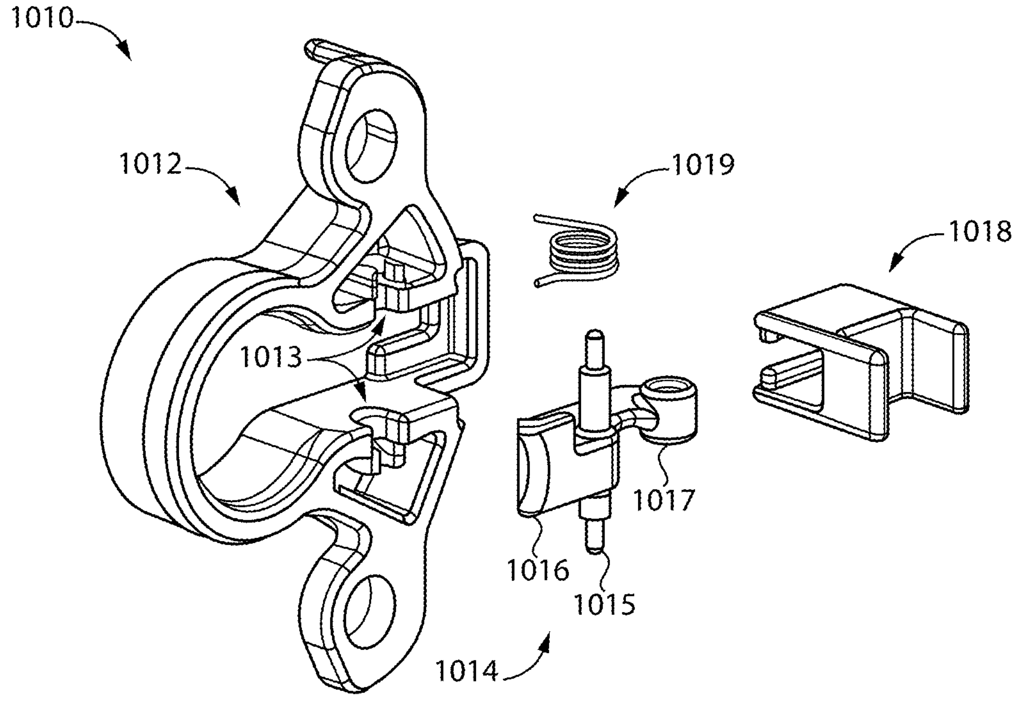
FIG. 33 is an exploded assembly view of a reversing mechanism according to certain embodiments.

With additional reference to FIG. 33, the illustrated reversing mechanism 1010 generally includes a mounting bracket 1012, a reversing lever 1014 pivotably mounted to the mounting bracket 1012, a lug simulator 1018 engaged with the reversing lever 1014, and a bias member 1019 engaged between the mounting bracket 1012 and the reversing lever 1014. The mounting bracket 1012 is mounted to the housing component 1080, and includes a bearing recess 1013 that receives a bearing post 1015 of the reversing lever 1014. Projecting from opposite sides of the bearing post 1015 are an input arm 1016 configured to engage a portion of the lock state selector, and an output arm 1017 engaged with the lug simulator 1018. As described herein, the reversing mechanism 1010 translates an actuating input in a first direction to movement of the lug simulator 1018 in a second direction opposite the first direction. In the illustrated form, the bias member 1019 biases the reversing lever 1014 toward its first position, and is provided in the form of a torsion spring. It is also contemplated that the bias member 1019 may bias the reversing lever 1014 toward its second position. Additionally or alternatively, the bias member 1019 may be provided in another form, such as one including a compression spring, an extension spring, a leaf spring, and elastic member, and/or magnets.

Figure 34:
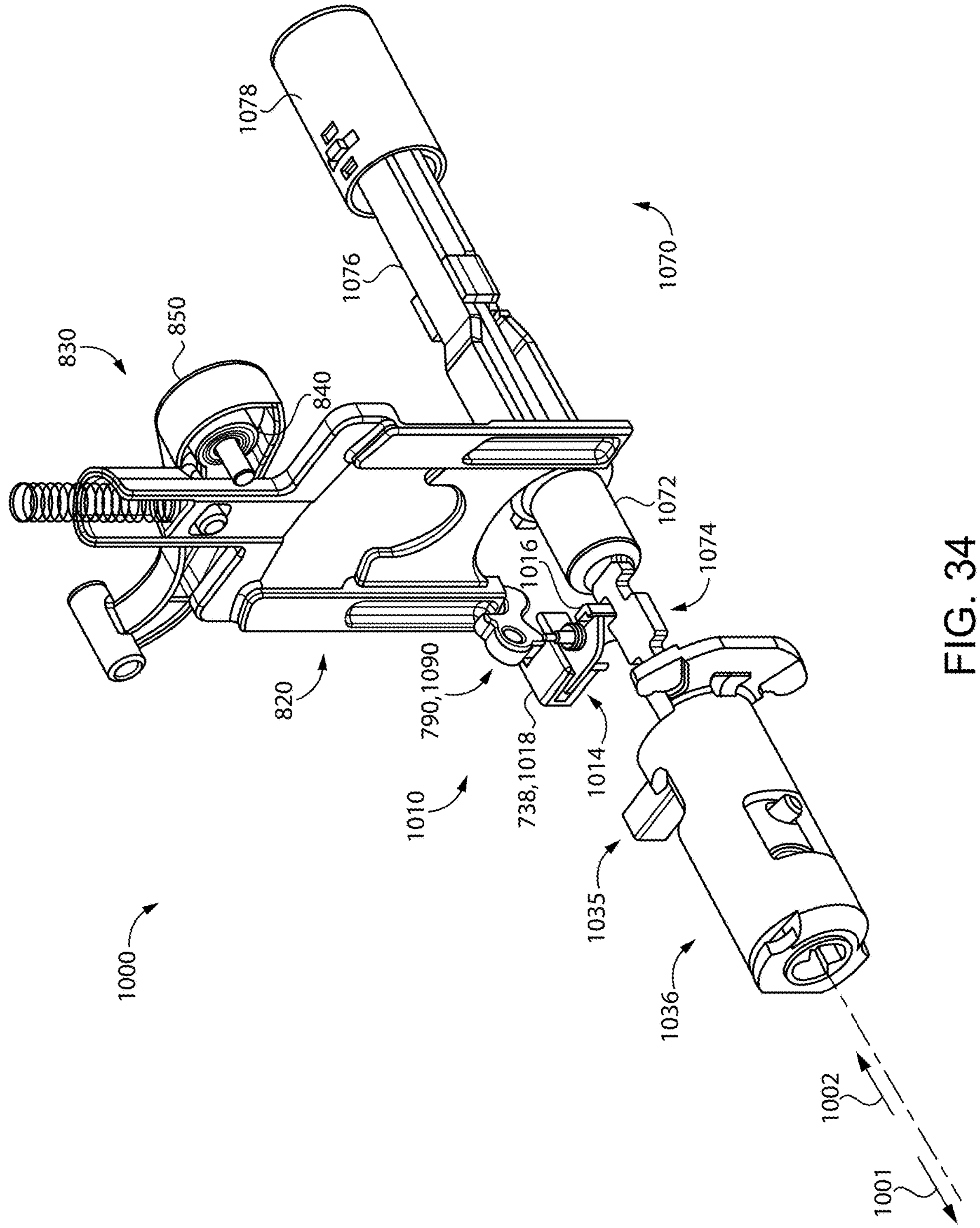
FIG. 34 is a perspective view of a portion of a lockset according to certain embodiments.

With additional reference to FIG. 34, illustrated therein are selected components of a lockset 1000 including the indicator assembly 800, the chassis 1030, and a lock state selector 1070 according to certain embodiments. In the interests of clarity, certain components of the lockset 1000 have been omitted from the illustration. The illustrated lock state selector 1070 is a pushbutton lock state selector, and generally includes a cup 1072, a plunger 1074 extending through the cup 1072, a stem 1076 coupled with the plunger 1074, and a pushbutton 1078 mounted to an end of the stem 1076. As is typical of pushbutton lock state selectors, depression of the pushbutton 1078 causes the plunger 1074 to drive the lock control lug 1035 in a first longitudinal direction 1001 from its unlocking position to its locking position to thereby lock the lockset 700. In the illustrated form, such movement of the plunger 1074 also causes the lock state selector 1070 to engage the input arm 1016 of the reversing lever 1014, thereby driving the lug simulator 1018 in an opposite second longitudinal direction 1002 against the biasing force of the bias member 1019 from its first position to its second position.

In the arrangement illustrated, the lug simulator 1018 serves as the moving component 738 that actuates the active pivot crank 1090. More particularly, movement of the moving lug simulator 738, 1018 from its first position to its second position causes the moving lug simulator 738, 1018 to engage the active pivot crank 1090 and actuate the indicator assembly 800 in a manner analogous to that described above with reference to FIGS. 29 and 30. Those skilled in the art will appreciate that such movement of the active pivot crank 1090 from its first position to its second position causes a corresponding movement of the indicator assembly 800 from the first state illustrated in FIGS. 23 and 24 to the second state illustrated in FIGS. 25 and 26.

While the illustrated lock state selector 1070 is provided in the form of a pushbutton lock state selector, it should be appreciated that other forms of lock state selector may be utilized. As one example, a lockset may instead include a turn-button lock state selector, in which rotation of a turn-button is converted (e.g., by a cam mechanism) to axial movement of a plunger to thereby provide the appropriate actuating input to the reversing lever 1014. As another example, a lockset may instead include a cylinder-actuated lock state selector in which rotation of a plug of a lock cylinder is converted (e.g., by a cam mechanism) to axial movement of a plunger to thereby provide the appropriate actuating input to the reversing lever 1014.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An indicator assembly for a lockset having a first state and a second state, the indicator assembly comprising:

- a backplate having a first side and an opposite second side, the backplate including an opening that extends between the first side and the second side, wherein the indicator assembly is configured for mounting to a door surface with the first side of the backplate facing the door surface and the second side of the backplate facing away from the door surface;
- a transfer link mounted for rotation relative to the backplate between a first transfer link position and a second transfer link position, wherein the transfer link includes:
  - an input portion positioned on the first side of the backplate;
  - an actuating portion positioned on the second side of the backplate; and
  - an arm extending through the opening in the backplate and connected between the input portion and the actuating portion; and
  - wherein the input portion is configured to drive the transfer link from the first transfer link position to the second transfer link position in response to the lockset transitioning from the first state to the second state;
- an indicator comprising a mechanical sign including a first indicium relating to the first state, wherein the mechanical sign is positioned on the second side of the backplate and is operable to be moved by the actuating portion such that the indicator selectively displays the first indicium; and a transmission connected between the transfer link and the indicator, wherein the transmission is configured to drive the indicator from a first indicator position to a second indicator position in response to movement of the transfer link from the first transfer link position to the second transfer link position.

2. The indicator assembly of claim 1, wherein the transmission comprises an input component, an output component engaged with the input component via a lost rotational motion connection, and a spring engaged between the input component and the output component.

3. The indicator assembly of claim 1, wherein the transmission is engaged with the actuating portion via a pair of meshed gear segments.

4. The indicator assembly of claim 1, wherein at least a portion of the arm extends parallel to a plane defined by the backplate.

5. The indicator assembly of claim 1, further comprising an escutcheon that at least partially defines a receiving space;

wherein the receiving space is further defined by the second side of the backplate; and wherein the indicator is positioned at least partially in the receiving space.

6. An indicator assembly for a lockset having a first state and a second state, the indicator assembly comprising:

a link configured to move from a first link position to a second link position in response to the lockset transitioning from the first state to the second state, the link comprising a first gear segment;

a gear comprising a second gear segment meshed with the first gear segment such that the gear moves from a first gear position to a second gear position in response to movement of the link from the first link position to the second link position;

a lever arm having a first lever arm position and a second lever arm position;

an anti-jam spring interposed between the gear and the lever arm, wherein the anti-jam spring is configured to move the lever arm from the first lever arm position to the second lever arm position in response to movement of the gear from the first gear position to the second gear position when the lever arm is free to move, and wherein the anti-jam spring is configured to store mechanical energy in response to movement of the gear when the lever arm is blocked from movement; and an indicator engaged with the lever arm such that the indicator displays a first indicium in response to the first lever arm position and does not display the first indicium in response to the second lever arm position.

7. The indicator assembly of claim 6, wherein the indicator comprises a mechanical sign including the first indicium.

8. The indicator assembly of claim 6, wherein the gear and the lever arm are coaxially mounted for pivotal movement.

9. The indicator assembly of claim 6, wherein the gear comprises a wall defining a cavity; and wherein a portion of the lever arm is seated in the cavity.

10. The indicator assembly of claim 6, wherein the gear comprises a wall defining a cavity; and wherein the anti-jam spring is seated in the cavity.

11. An indicator assembly for a lockset having a first state and a second state, the indicator assembly comprising:

an escutcheon comprising a window and partially defining a receiving space;

a backplate having a first side configured to face toward a door and an opposite second side that further defines the receiving space;

a transfer link mounted for rotation relative to the backplate, wherein the transfer link is configured to rotate from a first transfer link position to a second transfer link position in response to movement of the lockset from the first state to the second state, and wherein the transfer link comprises a first gear segment;

an indicator sign mounted in the receiving space for movement between a first indicator sign position, in which a first indicium relating to the first state is displayed via the window, a second indicator sign position, in which the first indicium is not displayed via the window;

a geared component comprising a second gear segment meshed with the first gear segment, wherein the geared component is configured to cause urging of the indicator sign from the first indicator sign position toward the second indicator sign position in response to movement of the transfer link from the first transfer link position toward the second transfer link position; and a lever arm engaged with the indicator sign, wherein the lever arm is engaged with the geared component via a lost rotational motion connection.

12. The indicator assembly of claim 11, further comprising a spring engaged between the lever arm component and the geared component.

13. An indicator assembly for a lockset having a first state and a second state, the indicator assembly comprising:

an escutcheon comprising a window and partially defining a receiving space;

a backplate having a first side configured to face toward a door and an opposite second side that further defines the receiving space;

a transfer link mounted for rotation relative to the backplate, wherein the transfer link is configured to rotate from a first transfer link position to a second transfer link position in response to movement of the lockset from the first state to the second state, and wherein the transfer link comprises a first gear segment;

an indicator sign mounted in the receiving space for movement between a first indicator sign position, in which a first indicium relating to the first state is displayed via the window, and a second indicator sign position, in which the first indicium is not displayed via the window; and a geared component comprising a second gear segment meshed with the first gear segment, wherein the geared component is configured to cause urging of the indicator sign from the first indicator sign position toward the second indicator sign position in response to movement of the transfer link from the first transfer link position toward the second transfer link position;

wherein the first gear segment is positioned in the receiving space and on the second side of the backplate; and wherein the transfer link further comprises an input portion positioned on the first side of the backplate, and an arm extending through an opening in the backplate.

14. An indicator assembly for a lockset having a first state and a second state, the indicator assembly comprising:

an input component configured to rotate about a first axis from a first input component position to a second input component position in response to movement of the lockset from the first state to the second state;

an output component operable to rotate about the first axis between a first output component position and a second output component position;

an anti-jam spring interposed between the input component and the output component, wherein the anti-jam spring is configured to drive the output component from the first output component position to the second output component position in response to rotation of the input component from the first input component position to the second input component position when the output component is free to move, and wherein the anti-jam spring is configured to store mechanical energy in response to rotation of the input component when the output component is blocked from movement;

an indicator engaged with the output component and configured to display a first indicium in response to the first output component position and to not display the first indicium in response to the second output component position; and a transfer link configured to rotate about a second axis in response to movement of the lockset between the first state and the second state, wherein the transfer link is engaged with the input component such that the input component rotates about the first axis in response to rotation of the transfer link about the second axis.

15. The indicator assembly of claim 14, wherein a first gear segment of the transfer link is meshed with a second gear segment of the input component to thereby cause the input component to rotate about the first axis in response to rotation of the transfer link about the second axis.

16. The indicator assembly of claim 14, wherein the input component and the output component are further engaged with one another via a lost rotational motion connection.

17. The indicator assembly of claim 14, further comprising a cavity defined between the input component and the output component, wherein the anti-jam spring is seated in the cavity.

* * * * *